(12) United States Patent
Mukerjee et al.

(10) Patent No.: US 8,209,175 B2
(45) Date of Patent: Jun. 26, 2012

(54) UNCERTAINTY INTERVAL CONTENT SENSING WITHIN COMMUNICATIONS

(75) Inventors: Kunal Mukerjee, Redmond, WA (US); Rafael Ballesteros, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1488 days.

(21) Appl. No.: 11/449,354

(22) Filed: Jun. 8, 2006

(65) Prior Publication Data

US 2007/0288231 A1    Dec. 13, 2007

(51) Int. Cl.
*G10L 15/04* (2006.01)
*G10L 21/00* (2006.01)

(52) U.S. Cl. ............ 704/251; 704/9; 704/242; 704/270

(58) Field of Classification Search ............... 704/9, 242, 704/251, 270
See application file for complete search history.

(56) References Cited

U.S. PATENT DOCUMENTS

| | | | | |
|---|---|---|---|---|
| 5,058,033 | A * | 10/1991 | Bonissone et al. | 706/52 |
| 5,621,859 | A * | 4/1997 | Schwartz et al. | 704/256 |
| 5,675,706 | A * | 10/1997 | Lee et al. | 704/256 |
| 5,797,123 | A * | 8/1998 | Chou et al. | 704/256.5 |
| 5,842,163 | A * | 11/1998 | Weintraub | 704/240 |
| 6,243,679 | B1 * | 6/2001 | Mohri et al. | 704/256.8 |
| 6,278,968 | B1 * | 8/2001 | Franz et al. | 704/3 |
| 6,442,524 | B1 * | 8/2002 | Ecker et al. | 704/277 |
| 6,473,781 | B1 * | 10/2002 | Skagerwall et al. | 709/201 |
| 6,842,767 | B1 | 1/2005 | Partovi et al. | |
| 6,937,699 | B1 | 8/2005 | Schuster et al. | |
| 7,092,883 | B1 * | 8/2006 | Gretter et al. | 704/242 |
| 2002/0004907 | A1 * | 1/2002 | Donahue | 713/200 |
| 2002/0032602 | A1 | 3/2002 | Lanzillo, Jr. et al. | |
| 2002/0082923 | A1 | 6/2002 | Merriman et al. | |
| 2002/0099600 | A1 | 7/2002 | Merriman et al. | |
| 2002/0138271 | A1 * | 9/2002 | Shaw | 704/270 |
| 2003/0225577 | A1 * | 12/2003 | Deng et al. | 704/226 |
| 2004/0093557 | A1 * | 5/2004 | Kawatani | 715/500 |
| 2004/0220809 | A1 * | 11/2004 | Wang et al. | 704/257 |
| 2005/0063525 | A1 | 3/2005 | Lin | |
| 2005/0154648 | A1 | 7/2005 | Strause | |
| 2005/0222846 | A1 | 10/2005 | Tomes | |
| 2005/0261994 | A1 | 11/2005 | Lawe | |
| 2006/0026629 | A1 | 2/2006 | Harris et al. | |

OTHER PUBLICATIONS

Bosc et al., "CALIN: a user interface based on a simple natural language", 1986, pp. 114-122, ACM Press, New York, US, http://portal.acm.org/citation.cfm?id=253168.253194&dl=portal&dl=ACM&type=series&idx=SERIES278&part=Proceedings&WantType=Proceedings&title=Annual%20ACM%20Conference%20on%20Research%20and%20Development%20in%20Information%20Retrieval.

Hurley et al., "Telephone Data Collection Using the World Wide Web", http://groups.csail.mit.edu/sls/publications/1996/icslp96-hurley.pdf.

Radev et al., "Generating Natural Language Summaries from Multiple On-Line Sources", http://tangra.si.umich.edu/~radev/papers/018.pdf, 1998.

Padmanabhan et al., "Issues Involved in Voicemail Data Collection", http://www.itl.nist.gov/iaui/894.01/publications/darpa98/html/vm20/vm20.htm, 1999.

* cited by examiner

*Primary Examiner* — Jialong He

(57) ABSTRACT

Repetition of content words in a communication is used to increase the certainty, or, alternatively, reduce the uncertainty, that the content words were actual words from the communication. Reducing the uncertainty of a particular content word of a communication in turn increases the likelihood that the content word is relevant to the communication. Reliable, relevant content words mined from a communication can be used for, e.g., automatic internet searches for documents and/or web sites pertinent to the communication. Reliable, relevant content words mined from a communication can also, or alternatively, be used to automatically generate one or more documents from the communication, e.g., communication summaries, communication outlines, etc.

20 Claims, 20 Drawing Sheets

| | | | |
|---|---|---|---|
| MATADOR | 0.9 | 6 | 5.4 |
| AND | 0.8 | 2 | 1.6 |
| GUNNAR | 0.8 | 3 | 2.4 |
| ARE | 0.9 | 2 | 1.8 |
| IN | 0.9 | 2 | 1.8 |
| PHASE | 0.7 | 4 | 2.8 |
| COMPLETION | 0.7 | 8 | 5.6 |
| MAT | 0.5 | 4 | 2.0 |
| ADORE | 0.5 | 3 | 1.5 |
| FEAR | 0.7 | 3 | 2.1 |
| OF | 0.7 | 2 | 1.4 |
| COMPETITION | 0.7 | 8 | 5.6 |

FIG. 4C

HYPOTHESIS 1: "MATADOR AND GUNNAR ARE IN PHASE COMPLETION"

(5.4   1.6   2.4   1.8  1.8   2.8    5.6      = 21.40)

(6     2     3     2    2     4      8        = 27)

21.40 / 27 = 0.79

HYPOTHESIS 2: "MAT ADORE AND GUNNAR ARE IN FEAR OF COMPETITION"

| | | |
|---|---|---|
| MATADOR 615 | 0.02 | 765 |
| GUNNAR 630 | 0.2 | 635 |
| PHASE | 0.3 | |
| COMPLETION | 0.3 | |
| MAT 640 | 0.2 | 770 |
| ADORE | 0.5 | |
| FEAR | 0.3 | |
| COMPETITION | 0.3 | 773 |
| WOULD 772 | 0.2 | |
| THROUGH 774 | 0.3 | |
| IMPLORE 776 | 0.5 | |
| MAIN | 0.2 | |
| CAMP | 0.3 | |
| MALE | 0.6 | |
| CAMPS | 0.6 | |

```
ALGORITHM UNCERTAINTYINTERVAL(WORD, THRESHOLD)
{
    UNCERTAINTY = 1.0;
    WHILE (UNCERTAINTY > THRESHOLD)
    {
        RECOGNIZE(WORD, CONFIDENCE);
        UNCERTAINTY *= (1.0 – CONFIDENCE);
    }
}
```

UNCERTAINTY INTERVAL CONTENT SENSING WITHIN COMMUNICATIONS

BACKGROUND

More and more, people are communicating using their computers and computer-based devices (e.g., BLACK-BERRY® hand-held devices, computer-based cell phones, etc.), collectively referred to herein as computing devices. And in our increasingly fast-paced, information-dependent society, people are interested in effective and efficient mechanisms to obtain relevant information. Thus it would be advantageous to support computing device users by providing, in a user effortless manner, quick, reliable and relevant information.

Pop-up advertisements (ads) are ubiquitous in the computer world we know today. Often as not however, pop-up ads have little or nothing to do with a particular person's interests or information desires. Moreover, even if such pop-up ads, or other ad forms on a web site, are in any manner relevant to the topic of the web site these ads are necessarily limited to association with the web sites that host them. Thus, ads hosted on one or more web sites have no relevance to or impact on the myriad other communication methods people use computing devices for, including, but not limited to, emails, text messaging, internet chat, VOIP (Voice Over Internet Protocol) phone calls (also referred to herein as IP calls), etc.

Additionally, there is a plethora of information to be accessed via the internet that can be relevant to one or more computing device users that is not an ad, or not an ad per see. For example, a computing device user may be engaged in an IP call with another user regarding a particular restaurant they are thinking of trying. The restaurant's menu might likely be both relevant and useful to the users' discussion if it was hosted on the internet and automatically presented to one or both of the users during their IP call.

As another example, a group of computing device users on a conference IP call regarding a particular technology subject could benefit from having one or more web links to papers and/or web sites that are pertinent to the technology subject under discussion automatically provided to them during their conference IP call.

As yet another example, reliable mining of content, i.e., key or information-rich, words from text, speech and/or audio/visual communicated over the internet can be used to develop pertinent summaries of the communication for, e.g., individuals who were unavailable to participate in the communication and/or as a useful recapitulation for communication participants.

There are a multitude of scenarios in which more reliable recognition of subject matter can be beneficially employed.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include technology that provides for quick and more reliable recognition of information-rich, i.e., key or content, words in a communication from a user and/or between two or more users on the internet.

In an embodiment a speech-based content sensing system is implemented to, with participating users' knowledge, monitor internet-hosted speech and/or audio/visual communications and quickly and reliably identify content words from the communication. In another embodiment a text-based content sensing system is implemented to, with participating users' knowledge, monitor internet-hosted text communications and quickly and reliably identify content words from the communication.

In both content sensing system embodiments the identified content words can be used by a search engine to locate web sites and/or documents hosted on the internet that are relevant to the content words, and thus, to the monitored communication. The identified content words also, or alternatively, can be used to generate summaries of the monitored communication and/or other useful document(s), including, but not limited to, outlines of the monitored communication and completed forms based on information from the communication.

In an aspect of an embodiment repetition of a content word in a monitored communication is used to increase the certainty, or conversely, decrease the uncertainty, that the content word was actually part of the communication. In an embodiment content words are scored an uncertainty value determined, in part, on their repetition in a monitored communication. In an embodiment, when a content word is scored an uncertainty value that meets a defined criteria the content word is deemed reliable for use in providing automatic user benefit, including, but not limited to, searching for web sites and/or internet-hosted documents relevant to the monitored conversation, generating a communication summary, etc.

BRIEF DESCRIPTION OF THE DRAWINGS

These and other features will now be described with reference to the drawings of certain embodiments and examples which are intended to illustrate and not to limit the invention, and in which:

FIG. 4C is a table containing the content words from the analyzed speech component of FIG. 4A, along with a certainty value, frame span value and weighted certainty value for each content word.

FIG. 4D is an example of embodiment calculations for determining a hypothesis confidence value.

FIG. 7C is an updated embodiment version of the hash table of FIG. 6 that now includes the content words derived from the analyzed speech component of FIG. 7A.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention. Any and all titles used throughout are for ease of explanation only and are not for use in limiting the invention.

Figure 1:
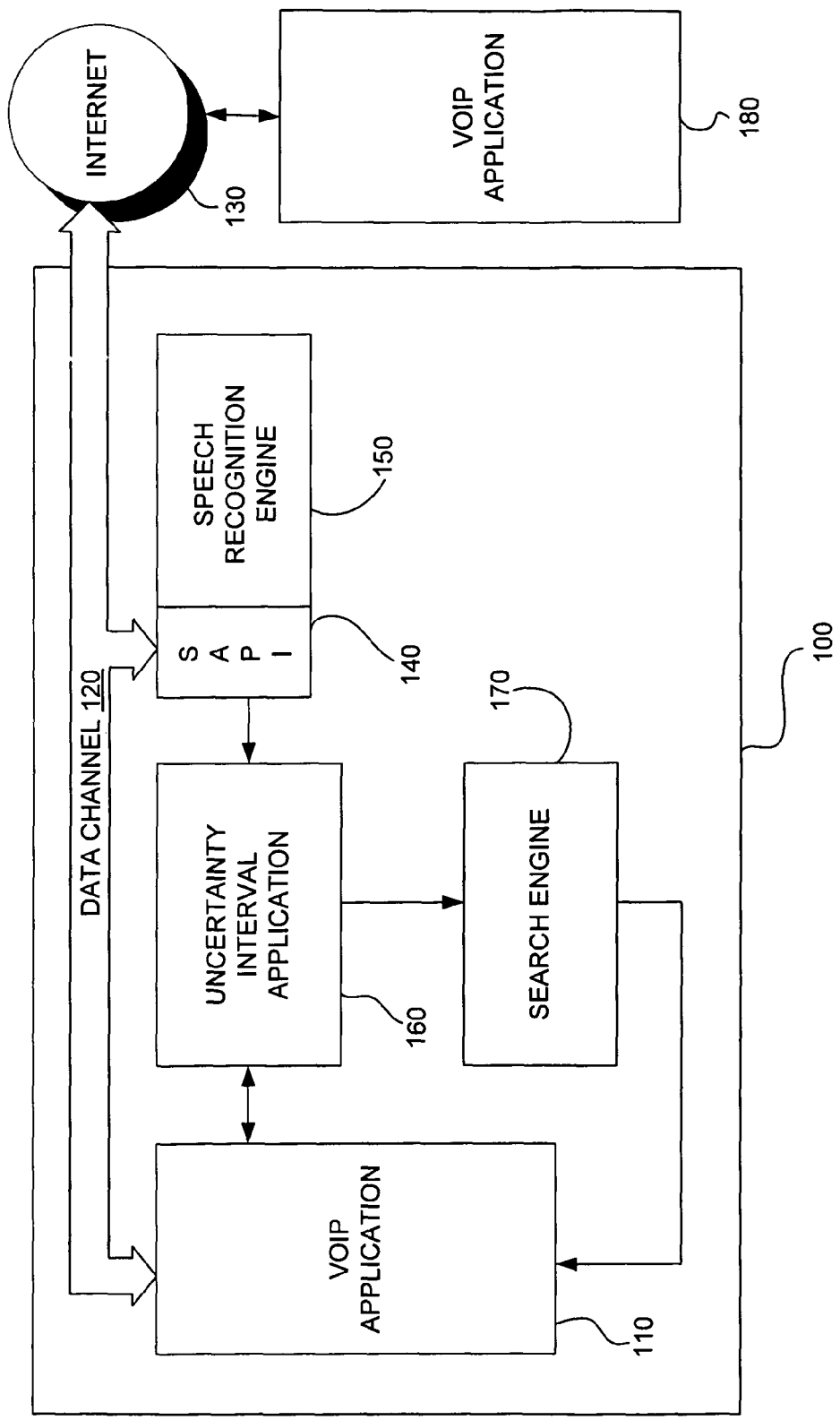
FIG. 1 is an embodiment speech-based content sensing system.

An embodiment speech-based content sensing system 100, depicted in FIG. 1, is an automatic, silent system for reliably sensing relevant words from speech, such as, e.g., speech in an IP call and/or audio/visual communications over the internet.

In an embodiment the speech-based content sensing system 100 uses relevant words identified in a monitored speech communication to automatically search the internet for documents and/or web sites pertinent to the communication topic(s). In an embodiment the web links for any located documents and/or web sites are presented to the individual whose communication is monitored. In an embodiment, if the monitored communication is between two or more individuals, e.g., an IP call, then the web links for any located documents and/or web sites are made available to each individual involved, or otherwise associated with, the monitored communication.

In an embodiment internet searches are automatically performed upon the identification of relevant words in a monitored communication. In an alternative embodiment internet searches are automatically performed if one or more individuals involved, or otherwise associated with, a monitored communication have requested internet searches be performed, e.g., by setting one or more parameters via the VOIP application they use, or otherwise access, and if relevant words are identified in the monitored communication. In still other alternative embodiments other mechanisms are employed for establishing when the speech-based content sensing system 100 is to perform internet searches with relevant words identified in a monitored communication.

In an embodiment the speech-based content sensing system 100 also, or otherwise, uses relevant words identified in a monitored speech communication to automatically generate one or more documents based on the communication. A document generated by the speech-based content sensing system 100, i.e., a tasked document, is anything created by or with any program or application using one or more relevant words identified from a monitored communication and that is in any file format. Examples of documents that can be generated by embodiments of the speech-based content sensing system 100 include, but are not limited to, a communication summary, a communication outline, forms, a web page, an email, a .wav file, an audio/visual file, an index, a table, a graph, any portion of any of these exemplary documents, etc.

In an embodiment one or more documents are automatically generated if relevant words are identified in a monitored communication. In an alternative embodiment one or more documents are automatically generated if one or more individuals involved, or otherwise associated with, a monitored communication request the documents be generated, e.g., by setting one or more parameters via the VOIP application they use, or otherwise access, and if relevant words are identified in the monitored communication.

In yet another alternative embodiment an individual can request one or more documents be automatically generated by the speech-based content sensing system 100 whenever their monitored communication contains one or more pre-identified key words. For example, in an exemplary embodiment an individual can request an airline reservation form be automatically generated from any of their monitored communications that contain the key words "travel," "flight," and "reservation".

In still other alternative embodiments other mechanisms are employed for establishing when the speech-based content sensing system 100 is to generate document(s), and which document(s), with relevant words identified in a monitored communication.

In an embodiment the generated documents are presented, or otherwise made available, to the individual whose communication is monitored. In an embodiment, if the monitored communication is between two or more individuals, e.g., an IP call, then the generated documents are made available to each individual involved, or otherwise associated with, the monitored communication.

In the embodiment speech-based content sensing system 100 of FIG. 1 the VOIP (Voice Over Internet Protocol) application 110 manages the communication, such as an IP (Internet Protocol) call, for a user of the device that is running, or otherwise accessing, the VOIP application 110, i.e., the computing device user associated with the VOIP application 110. The VOIP application 110 is the technology, in software, hardware, or a combination of software/hardware, that allows a computing device user to communicate by, e.g., making or receiving telephone calls using a broadband internet connection instead of a regular, or analog, phone line.

In an embodiment of the speech-based content sensing system 100 the VOIP application 110 uses a PCM (Pulse Code Modulation) data channel 120 for transmitting a user's digitized speech to other individual(s) involved in a conversation, or to an alternative computing device, e.g., but not limited to, a computer, via the internet 130. The PCM data channel 120 is also used to transmit the user's digitized speech to a SAPI (Speech Application Program Interface) 140 associated with a SR (Speech Recognition) Engine 150. In an embodiment the PCM data channel 120 transmits other individual(s)', i.e., other computing device user(s)', digitized speech and/or audio/visual to the SAPI 140 associated with the SR Engine 150. In this manner, the digitized speech and/or audio/visual of other individuals involved in a communication with the computing device user associated with the VOIP application 110 is also processed by the SR Engine 150.

Data channel formats other than PCM that support VOIP communication can be used in other embodiments.

In an embodiment the SAPI 140 is an extension that, inter alia, gives computing devices the ability to recognize human speech as input and create human-like audio output from printed text. In an embodiment the SAPI 140 is the interface between the VOIP application 110 and the SR Engine 150, as well as the interface between the Uncertainty Interval application 160 and the SR Engine 150.

In an embodiment the Uncertainty Interval application 160 is the component of the speech-based content sensing system 100 that connects all the other pieces, or components, of the system 100 together. In an embodiment the Uncertainty Interval application 160 establishes a data channel layer connection, such as a PCM level data layer connection, between the VOIP application 110 and the SAPI 140 in order that the data channel 120 transmits digitized speech and/or audio/visual to the SAPI 140 associated with the SR Engine 150.

The SR Engine 150 functions to identify the speech, i.e., the words and/or phrases, transmitted on the PCM data channel 120. In an embodiment the SR Engine analyzes speech components as it receives them from its SAPI 140 via the PCM data channel 120. In an embodiment a speech component is a segment of a monitored speech or audio/visual communication, e.g., a sentence, a combination of sentences, a phrase, a word, etc.

In an embodiment the SR Engine 150 generates one or more hypotheses for an analyzed speech component. In an embodiment a hypothesis is a determination the SR Engine 150 renders for a particular analyzed speech component. For example, a computing device user may utter the sentence: "Matador and Gunnar are in fear of competition," referring to two hypothetical companies, Matador and Gunnar. From this sentence the SR Engine 150 could generate one hypothesis to be "Matador and Gunnar are in phase competition," and a second hypothesis to be "Mat adore and Gunnar are in fear of competition".

In an embodiment the SR Engine 150 transmits, or otherwise provides, the generated hypotheses, or some subset thereof, to the Uncertainty Interval application 160.

In an embodiment the SR Engine 150 scores each generated hypothesis and passes this hypothesis confidence score with each associated hypothesis to the Uncertainty Interval application 160. In an embodiment the SR Engine 150 assigns higher hypothesis confidence scores to those hypotheses it deems most likely to be correct, as further explained below.

In an embodiment the number of hypotheses an SR Engine 150 generates for an analyzed speech component is limited by the maximum amount of memory and CPU cycles available to the SR Engine 150. In this embodiment these limitations help to ensure that the SR Engine 150 does not exhaust the available memory for temporarily storing the hypotheses, or take more time to generate the top recognition hypothesis(es) than is appropriate for the overall system 100's goal of providing timely and relevant information to computing device users.

In an embodiment the SR Engine 150 creates a lattice from all the hypotheses it generates for an analyzed speech component transmitted on the PCM data channel 120. In an embodiment a lattice is a directed graph. Each node of a lattice represents a word, each arc between two nodes in a lattice represents a path from one word to the next, and each path from a beginning, first, node to an end, last, node represents one possible hypothesis for an analyzed communication, e.g., speech, component. In an embodiment the SR Engine 150, via its SAPI 140, provides the lattice as well as the hypotheses and their hypothesis confidence scores for an analyzed speech component to the Uncertainty Interval application 160. In an alternative embodiment, the SR Engine 150, via its SAPI 140, provides the lattice for an analyzed speech component to the Uncertainty Interval application 160.

In an embodiment the Uncertainty Interval application 160 receives, or otherwise has access to, the hypotheses and their hypothesis confidence scores, as well as the lattice of hypotheses, from the SAPI 140 and determines, as further explained below, what, if any, words and/or phrases to pass on to the Search Engine 170, e.g., but not limited to, MSN SEARCH®. In an alternative embodiment the Uncertainty Interval application 160 receives, or otherwise has access to, the lattice for an analyzed speech component and determines, as further explained below, what, if any, words and/or phrases to pass on to the Search Engine 170.

The Search Engine 170 uses the words and/or phrases from the Uncertainty Interval application 160 to search the internet for relevant information, including, but not limited to, documents, web sites, etc. In an embodiment the Search Engine 170 provides the web link(s) for any located relevant information to the VOIP application 110 which displays the web link(s) to the computing device user associated with the VOIP application 110.

In an embodiment, if the monitored communication is a conversation, e.g., an IP call, the VOIP application 1 10 forwards the search results, i.e., web link(s), on the data channel 120 to the VOIP applications 180 associated with other individuals involved in, or otherwise associated with, the communication. In this manner the search results can also be presented to these other individuals by their respective VOIP applications 180.

In an embodiment the Uncertainty Interval application 160 receives, or otherwise has access to, the hypotheses and their hypothesis confidence scores, as well as the lattice of hypotheses, from the SAPI 140 and determines what, if any, words and/or phrases to use in creating the tasked document(s). In an alternative embodiment the Uncertainty Interval application 160 receives, or otherwise has access to, the lattice for an analyzed speech component and determines what, if any, words and/or phrases to use in creating any tasked documents.

In an embodiment, if the speech-based content sensing system 100 is tasked with generating one or more documents from a monitored communication, at the end of the monitored communication the Uncertainty Interval application 160 generates the tasked documents from various content words identified from the analyzed speech components of the monitored communication and provides the generated documents to the VOIP application 110. In an alternative embodiment, if the speech-based content sensing system 100 is tasked with generating one or more documents from a monitored communication, the Uncertainty Interval application 160 works on generating the documents as relevant content words are identified from the analyzed speech components of the monitored communication. In this alternative embodiment, at the end of the monitored communication, when the tasked documents have been generated, the Uncertainty Interval application 160 provides the documents to the VOIP application 110.

In an embodiment the VOIP application 110 displays the generated document(s) to the computing device user associated with the VOIP application 110. In an alternative embodiment the VOIP application 110 provides an indication, such as, but not limited to, a pop-up window on the user's computing device display, that informs the user that one or more documents were created and where they are stored for access by the user.

In an embodiment, if the monitored communication is a conversation, e.g., an IP call, the VOIP application 110 forwards the generated document(s) on the data channel 120 to the VOIP applications 180 associated with other individuals involved in, or otherwise associated with, the communication in order that the document(s) are available to these other individuals.

In an embodiment the Uncertainty Interval application 160 tells the SR Engine 150 how many (i.e., "n") hypotheses to return for an analyzed speech component. In this embodiment, if the SR Engine 150 generates at least "n" hypotheses for an analyzed speech component it will return, or otherwise provide the Uncertainty Interval application 160 access to, the top scoring hypothesis and "n-1" alternative hypotheses. In an embodiment the "n-1" alternative hypotheses made available to the Uncertainty Interval application 160 are the next scoring hypotheses in sorted order.

Figure 2:
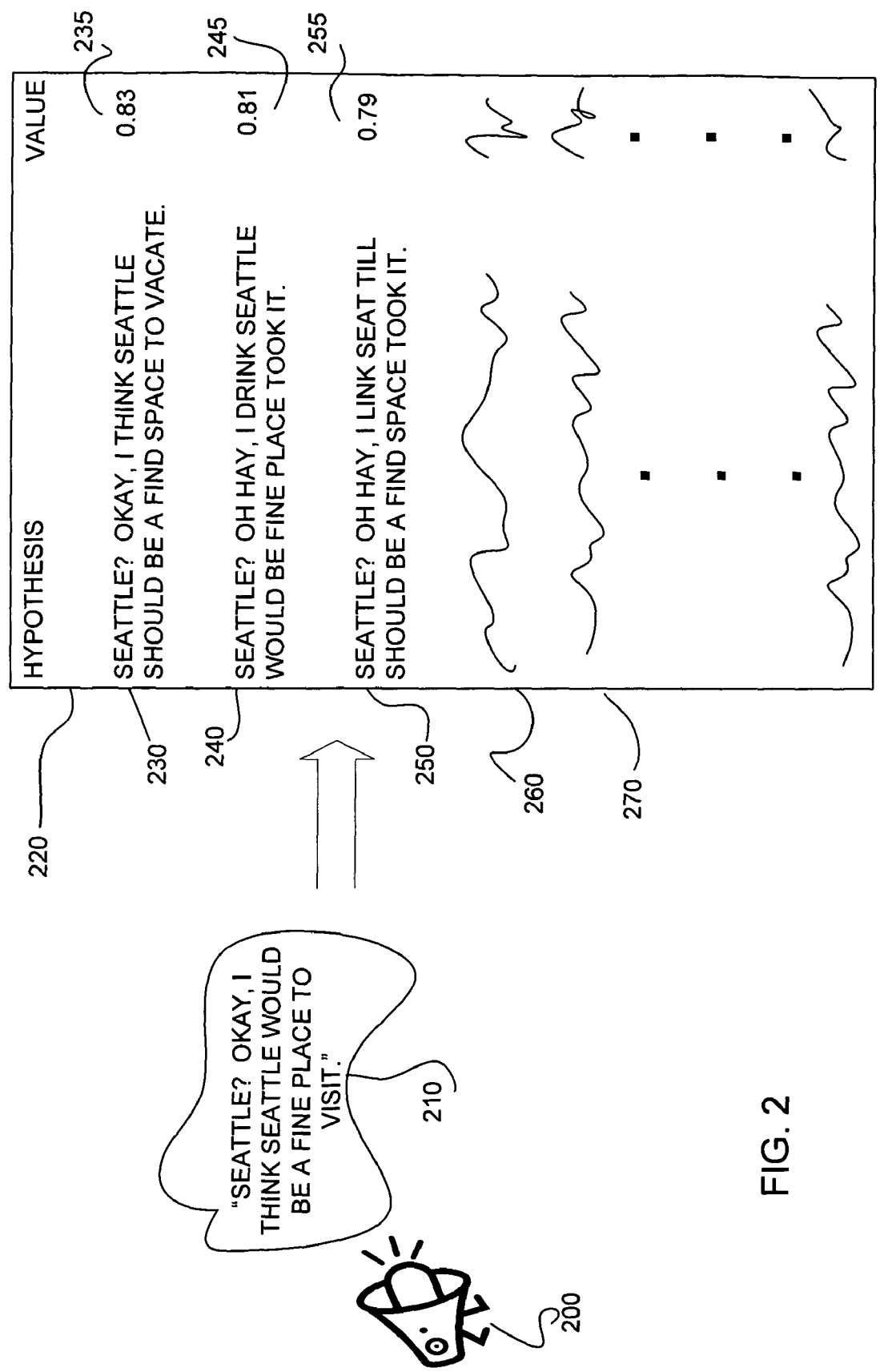
FIG. 2 is an exemplary analysis of a speech component uttered by a computing device user.

For example, and referring to FIG. 2, assume a computing device user 200 utters the speech component 210 "Seattle? Okay, I think Seattle would be a fine place to visit." Further assume that the SR Engine 150 generates "x" number of hypotheses 220 from this speech component 210. The top scoring hypothesis 230, with a hypothesis confidence score 235 of eighty-three one-hundreds (0.83), is "Seattle? Okay, I think Seattle should be a find space to vacate." The next scoring hypothesis 240, with a hypothesis confidence score 245 of eighty-one one-hundreds (0.81), is "Seattle? Oh hay, I drink Seattle would be fine place took it." The third scoring hypothesis 250, with a hypothesis confidence score 255 of seventy-nine one-hundreds (0.79) is "Seattle? Oh hay, I link seat till should be a find space took it," and so on.

In an embodiment, if the Uncertainty Interval application 160 instructs the SR Engine 150 to provide five (5) hypotheses for an analyzed speech component, then in the example of FIG. 2 the SR Engine 150 will provide the Uncertainty Interval application 160 the top scoring hypothesis 230 and the next four (4) top scoring alternative hypotheses 240, 250, 260 and 270.

In an embodiment the sorted order begins with the most likely hypothesis as determined by the SR Engine 150, i.e., the hypothesis with the highest hypothesis confidence score, and ends with the least likely hypothesis as determined by the SR Engine 150, i.e., the hypothesis with the lowest hypothesis confidence score. In alternative embodiments the SR Engine 150 provides the Uncertainty Interval application 160 hypotheses in other sorted orders, e.g., but not limited to, from the least likely hypothesis to the most likely hypothesis, from the first generated hypothesis to the last generated hypothesis, etc. In yet other alternative embodiments hypotheses are provided the Uncertainty Interval application 160 by the SR Engine 150 in no particular, i.e., in random, order.

In an embodiment, if the SR Engine 150 generates less than the number of hypotheses requested by the Uncertainty Interval application 160 for an analyzed speech component then the SR Engine 150 provides the Uncertainty Interval application 160 all the generated hypotheses. For example, and again referring to FIG. 2, if the Uncertainty Interval application 160 requests ten (10) hypotheses for each analyzed speech component and the SR Engine 150 only generates hypotheses 230, 240 and 250 for the speech component 210, then the SR Engine 150 will provide all the generated hypotheses, hypotheses 230, 240 and 250, in sorted order, to the Uncertainty Interval application 160.

In an embodiment the more hypotheses the SR Engine 150 can generate for a particular speech component the better accuracy the speech-based content sensing system 100 can provide. In an embodiment the more hypotheses the Uncertainty Interval application 160 accepts from the SR Engine 150 the better accuracy the speech-based content sensing system 100 can provide.

In an embodiment, if the Uncertainty Interval application 160 requests less than the total number of hypotheses generated for an analyzed speech component, the SR Engine 150, via its SAPI 140, will, along with the requested number of hypotheses and their hypothesis confidence scores, only provide the Uncertainty Interval application 160 a lattice containing those hypotheses provided the Uncertainty Interval application 160. In this embodiment, those hypotheses not provided the Uncertainty Interval application 160 are also not included in the lattice provided the Uncertainty Interval application 160.

In an alternative embodiment, if the Uncertainty Interval application 160 requests less than the total number of hypotheses generated for an analyzed speech component, the SR Engine 150, via its SAPI 140, provides the Uncertainty Interval application 160 a lattice containing only the requested number of hypotheses.

In another alternative embodiment the Uncertainty Interval application 160 accepts, or otherwise accesses, all the hypotheses, as well as their hypothesis confidence scores, generated by the SR Engine 150 for an analyzed speech component. In this alternative embodiment the lattice provided the Uncertainty Interval application 160 for the analyzed speech component contains all the generated hypotheses for the speech component.

In still another alternative embodiment the SR Engine 150, via its SAPI 140, provides the Uncertainty Interval application 160 a lattice containing all the generated hypotheses.

In some, generally rare, instances the SR Engine 150 may produce only one hypothesis for an analyzed speech component. These limited instances include, for example, a small and constrained grammar sample.

Figure 3:
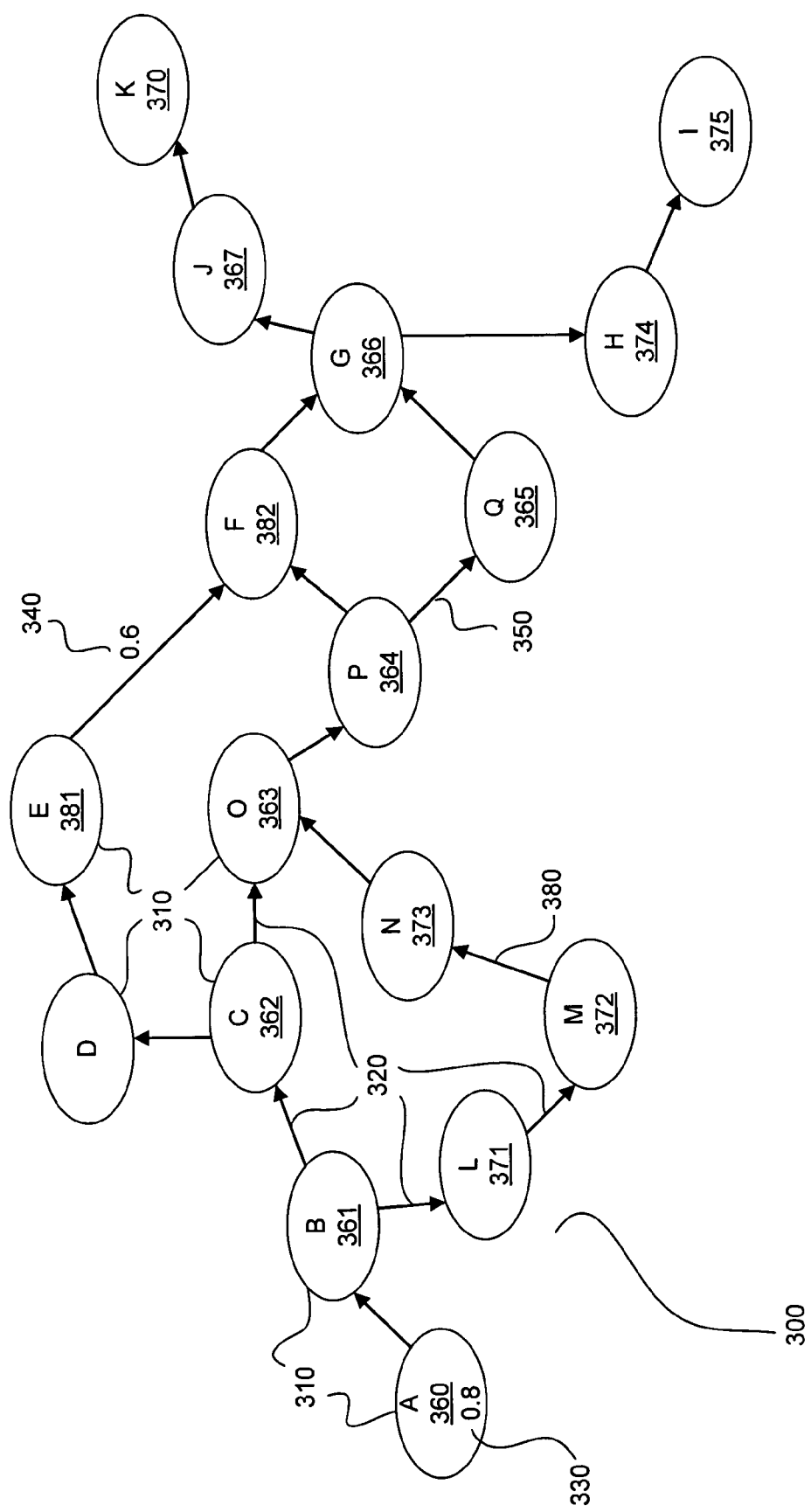
FIG. 3 depicts an exemplary lattice produced by an embodiment Speech Recognition Engine.

As discussed, in an embodiment the SR Engine 150 creates a lattice of the hypotheses it generates for each analyzed speech component. Referring to the exemplary lattice 300 of FIG. 3, in an embodiment each node 310 of a lattice 300 represents a word of a hypothesis, each arc 320 between two nodes 310 in a lattice 300 represents a path from one word of a hypothesis to the next, and each path, e.g., path 350, from a beginning, first, node, e.g. node A 360, to an end, last, node, e.g. node K 370, represents one possible hypothesis for a speech component transmitted on the PCM data channel 120.

In an embodiment any particular lattice has one or more different paths, each path representing one hypothesis, for the particular speech component that the SR Engine 150 analyzed. For example, the path 350, consisting of nodes A 360, B 361, C 362, 0 363, P 364, Q 365, G 366, J 367 and K 370, is one hypothesis for an analyzed speech component, and path 380, consisting of nodes A 360, B 361, L 371, M 372, N 373, 0 363, P 364, Q 365, G 366, H 374 and I 375, is a second hypothesis for the same analyzed speech component.

In an embodiment the SR Engine 150 associates a certainty value with each node 310, i.e., word, in a lattice 300, e.g., certainty value 330 of eight-tenths (0.8) for node A 360. In an embodiment the SR Engine 150 associates a certainty value with each arc 320, i.e., path, between two nodes 310 of a lattice 300, e.g., certainty value 340 of six-tenths (0.6) for the path between node E 381 and node F 382. In an embodiment the certainty values for each node 310 of a lattice 300 are the SR Engine 150's determination of the certainty that the word represented by the node 310 was the actual spoken word of the analyzed speech component. In an embodiment the certainty values for each arc 320 of a lattice 300 are the SR Engine 150's determination of the certainty that the path represented by the arc 320 is the correct path between two words of the analyzed speech component.

In an embodiment the certainty value for each node 310 is included with the lattice 300 provided the Uncertainty Interval application 160 for an analyzed speech component. In an embodiment the certainty value for each arc 320 is included with the lattice 300 provided the Uncertainty Interval application 160 for an analyzed speech component.

As discussed, in an embodiment the SR Engine 150 generates and provides the Uncertainty Interval application 160 a hypothesis confidence score for each hypothesis it generates and provides the Uncertainty Interval application 160. In an embodiment a hypothesis confidence score is a frame weighted average of the certainty values of the nodes 310 of the lattice 300 for the hypothesis. In this embodiment the certainty value for each node 310, i.e., word of a hypothesis, is weighted by the number of audio frames that the word spans. In an embodiment each audio frame is ten (10) milliseconds of the analyzed audio on the PCM data channel 120. In alternative embodiments an audio frame can be longer or shorter.

In an embodiment the SR Engine 150 weights, i.e., multiplies, each node's certainty value by the number of audio frames that the word represented by the node 310 spans to generate a weighted certainty value for the node 310. The SR Engine 150 then averages all the weighted certainty values for all the nodes 310 in a hypothesis to generate the hypothesis confidence score.

Figure 4A:
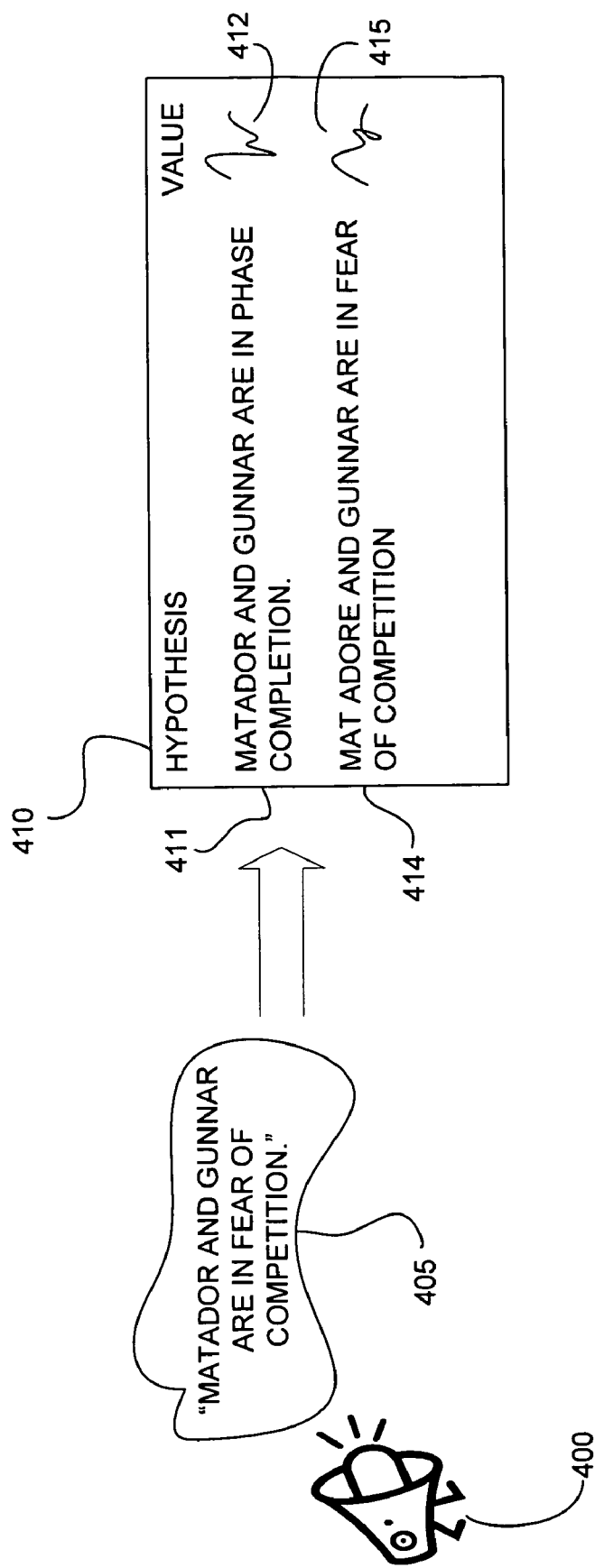
FIG. 4A is an exemplary analysis of a speech component uttered by a computing device user.

For example, and referring to FIG. 4A, assume a computing device user 400 utters the speech component 405 "Matador and Gunnar are in fear of competition," referring to two hypothetical companies, Matador and Gunnar. Further assume that the SR Engine 150 generates two (2) hypotheses 410 for speech component 405. A first hypothesis 411, with a hypothesis confidence score 412, is "Matador and Gunnar are in phase completion". A second hypothesis 414, with a hypothesis confidence score 415, is "Mat adore and Gunnar are in fear of competition".

Figure 4B:
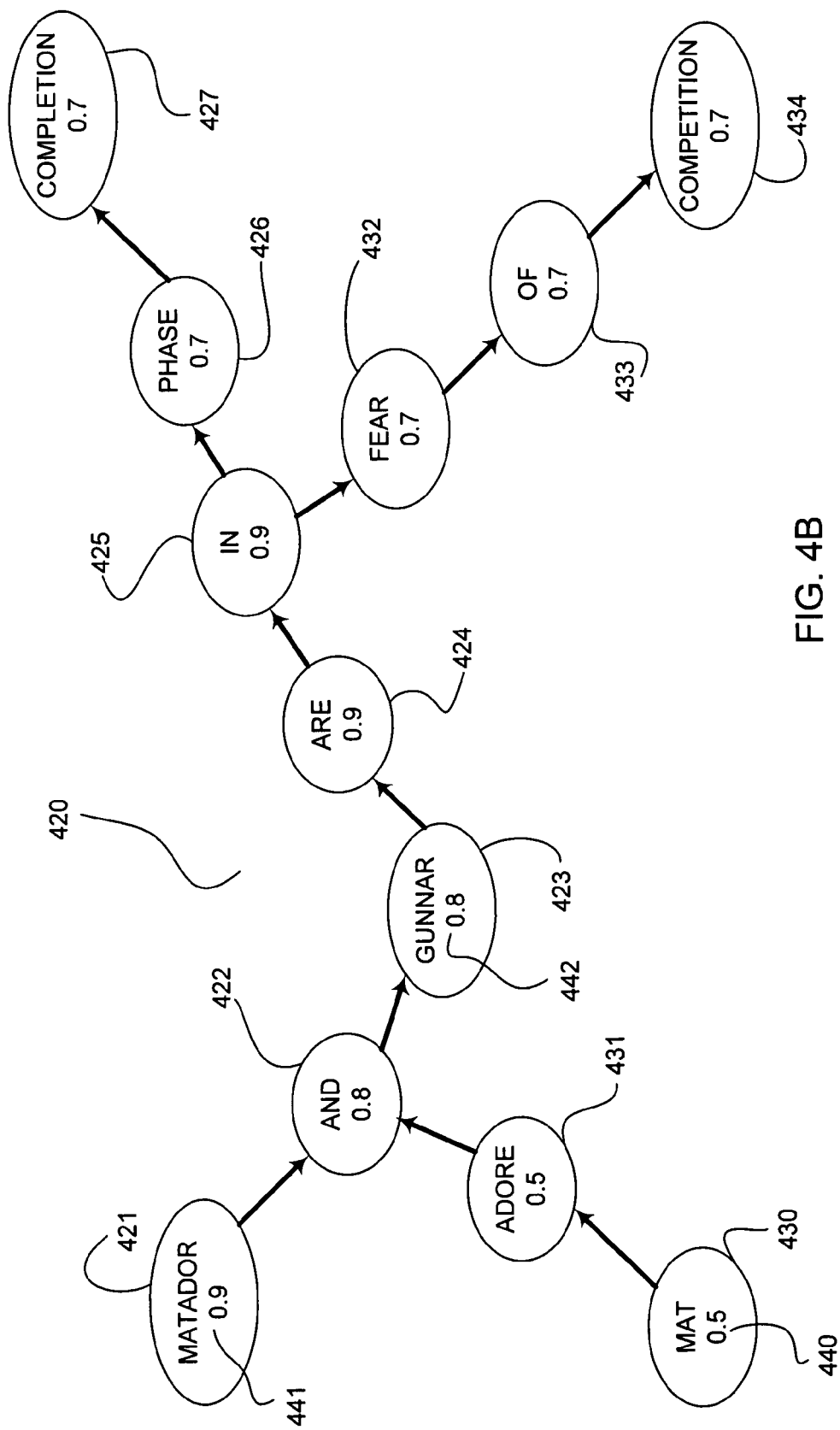
FIG. 4B depicts an exemplary lattice produced by an embodiment Speech Recognition Engine for the analyzed speech component of FIG. 4A.

An exemplary lattice 420 for the two (2) hypotheses 411 and 414 is depicted in FIG. 4B. Hypothesis 411, "Matador and Gunnar are in phase competition," has nodes 421, 422, 423, 424, 425, 426 and 427. Hypothesis 414, "Mat adore and Gunnar are in fear of competition," has nodes 430, 431, 422, 423, 424, 425, 432, 433 and 434.

For each node, i.e., word, of the lattice 420 the SR Engine 150 assigns a certainty value 440, which is an indication of how certain the SR Engine 150 is that the word is the one that was actually spoken in the analyzed speech component 405. Referring to the table 450 of FIG. 4C, each node 445 of the lattice 420 of FIG. 4B has a frame span value 455, which is the number of audio frames that the word represented by the node 445 spans. Weighting, i.e., multiplying, the certainty value 440 for each node 445 by the node's frame span value 455 generates a weighted certainty value 460 for each node 445 of the lattice 420.

In an embodiment the weighted certainty values 460 of each node 445 of a hypothesis are added together and the sum is divided by the total number of audio frames the hypothesis spans, i.e., the sum of the frame span values 455 of each node 445 in the hypothesis. The resultant value is the hypothesis confidence score.

For example, referring to FIG. 4D, for the first hypothesis 411 of FIG. 4A, "Matador and Gunnar are in phase completion," the value twenty-one and four-tenths (21.40) is the sum 472 of the weighted certainty values 460 for each of its nodes 445. The value twenty-seven (27) is the sum 474 of the number of audio frames that hypothesis 411 spans, i.e., the sum 474 of the frame span values 455 of each node 445 in the hypothesis 411. Dividing the sum 472 of the weighted certainty values 460 (value 21.40) by the sum 474 of the number of audio frames that hypothesis 411 spans (value 27) generates a hypothesis confidence score 476 with a value of seventy-nine one-hundreds (0.79) for hypothesis 411.

Likewise, for the second hypothesis 414 of FIG. 4A, "Mat adore and Gunnar are in fear of competition," the value twenty and two-tenths (20.20) is the sum 482 of the weighted certainty values 460 for each of its nodes 445. The value twenty-nine (29) is the sum 484 of the number of audio frames that hypothesis 414 spans, i.e., the sum 484 of the frame span values 455 of each node 445 in the hypothesis 414. Dividing the sum 482 of the weighted certainty values 460 (value 20.20) by the sum 484 of the number of audio frames that hypothesis 414 spans (value 29) generates a hypothesis confidence score 486 with a value of seven-tenths (0.7) for hypothesis 414.

In an embodiment the SR Engine 150, via its SAPI 140, provides the hypothesis 411, "Matador and Gunnar are in phase completion," the hypothesis confidence score 476, the hypothesis 414, "Mat adore and Gunnar are in fear of competition," the hypothesis confidence score 486, and the lattice 420 of FIG. 4B to the Uncertainty Interval application 160 for the analyzed speech component 405 of FIG. 4A.

In an embodiment the SR Engine 150 generates one node 310 of a lattice 300 for each word in any hypothesis for an analyzed speech component. For example, and referring again to FIG. 4B, both the first hypothesis 411 and the second hypothesis 414 for the analyzed speech component 405 contain the words "and," "Gunnar," "are," and "in." In this embodiment the SR Engine 150 generates only one node 310 for each of these words, i.e., node 422 ("and"), node 423 ("Gunnar"), node 424 ("are"), and node 425 ("in"), for the lattice 420.

Figure 5:
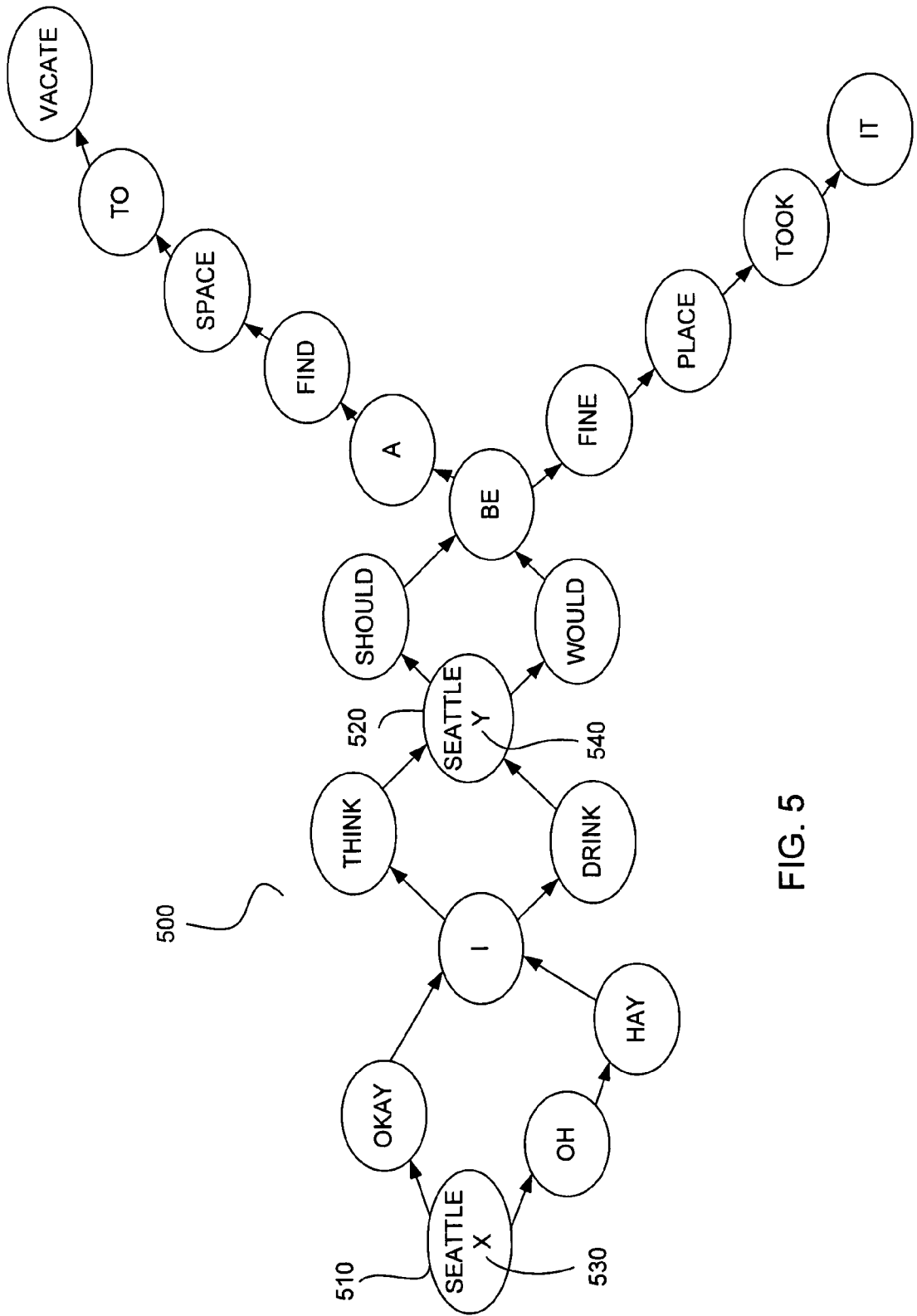
FIG. 5 depicts an exemplary lattice produced by an embodiment Speech Recognition Engine for the analyzed speech component of FIG. 2.

In an embodiment the SR Engine 150 generates a separate node 310 each time the same word appears in a hypothesis. As an example, for the analyzed speech component "Seattle? Okay, I think Seattle would be a fine place to visit" 210 of FIG. 2, assume the SR Engine 150 generates two hypotheses, hypothesis 230 and hypothesis 240. An exemplary lattice 500 containing these two hypotheses is shown in FIG. 5. As the word "Seattle" appears twice in both hypotheses 230 and 240, the lattice 500 has two nodes, node 510 and node 520, each representing one occurrence of the word "Seattle". The SR Engine 150 assigns a certainty value (X) 530 to node 510 for the first occurrence of the word "Seattle," and a certainty value (Y) 540 to node 520 for the second occurrence of the word "Seattle". In an embodiment the certainty value (X) 530 can be, but need not be, the same as the certainty value (Y) 540.

As previously noted, in an embodiment the SR Engine 150, via its SAPI 140, provides the Uncertainty Interval application 160 "n" number of hypotheses and their respective hypothesis confidence scores, as well as the lattice containing the hypotheses for an analyzed speech component. However, in an embodiment the Uncertainty Interval application 160 does not rely on the hypothesis confidence scores from the SR Engine 150, at least in and of themselves, to identify words and/or phrases of a monitored communication to use for further processing.

In an embodiment the Uncertainty Interval application 160 filters out, or otherwise deletes or ignores, all non-content, i.e., non-key or information-poor, words in a lattice from the SR Engine 150, ensuring that such non-relevant speech is not forwarded to the Search Engine 170 or used to generate tasked documents regardless of its multiple usage and/or high confidence identification.

In an embodiment non-content words are words that in and of themselves do not provide meaningful insight into the subject matter of the analyzed speech component, e.g., but not limited to, prepositions, e.g., "in," "at," "like," "of,"etc., pronouns, e.g., "I," "we," "they," "he," "she," etc., limiting adjectives, e.g. "a," "the," "few," "each," etc.

In an embodiment the Uncertainty Interval application 160 has, or has access to, a list of non-content words it uses to determine which words of a lattice are non-content words. In alternative embodiments other data compilation forms can be used to identify non-content words.

In an embodiment words of a language are assigned numbers that are used to represent the words. In an embodiment more common words are assigned lower numbers in order that less bits are used to represent these common, frequently occurring words. In an embodiment words that are more common in a language, i.e., appear most frequently in conversations, also have less content significance, and thus, can be deemed to be non-content words.

In an alternative embodiment the Uncertainty Interval application 160 identifies all words assigned a pre-designated number (Z) or less as non-content words, and all words assigned a number greater than Z as content words. In another alternative embodiment, the Uncertainty Interval application 160 identifies all words assigned less than a pre-designated number (Z) as non-content words, and all words assigned the number Z or greater as content words.

In still another alternative embodiment the Uncertainty Interval application 160 has, or has access to, a list of content words that are the only content words, if they exist, to be processed from the lattices generated by the SR Engine 150. In this alternative embodiment only the content words identified in the list are treated as content words in the lattices, with all other words being ignored or otherwise unused.

In an alternative aspect of this alternative embodiment other data compilation forms can be used to identify a set of content words that are the only content words to be processed from the lattices.

An exemplary embodiment Keywords API for establishing a set of content words to be processed from the lattices generated by the SR Engine 150 has the call:
SetKeyWordInterest(float minConfidenceThreshold, WORDLIST *pWords);

In this exemplary Keywords API the SetKeyWordInterest call provides the speech-based content sensing system 100, and the Uncertainty Interval application 160, with a list (WORDLIST *pWords) of the content words that are the only content words the Uncertainty Interval application 160 is to process from the lattices generated by the SR Engine 150. In an embodiment, using the SetKeyWordInterest call with *pWords established as a NULL pointer informs the speech-based content sensing system 100, and the Uncertainty Interval application 160, to process all content words in the lattices.

In an embodiment, once the Uncertainty Interval application 160 identifies the non-content words of a first lattice for a monitored communication, or, alternatively, identifies the content words of this lattice, it forms a hash table for the content words of the lattice. In an embodiment the Uncertainty Interval application 160 assigns an uncertainty value to each such content, i.e., key or information-rich, word of the hash table. In an embodiment the uncertainty value assigned the first occurrence of a content word in an analyzed communication is one (1) minus the certainty value assigned the word, i. e., respective lattice node 310, by the SR Engine 150:

UNCERTAINTY VALUE=1=CERTAINTY VALUE

Figure 6:
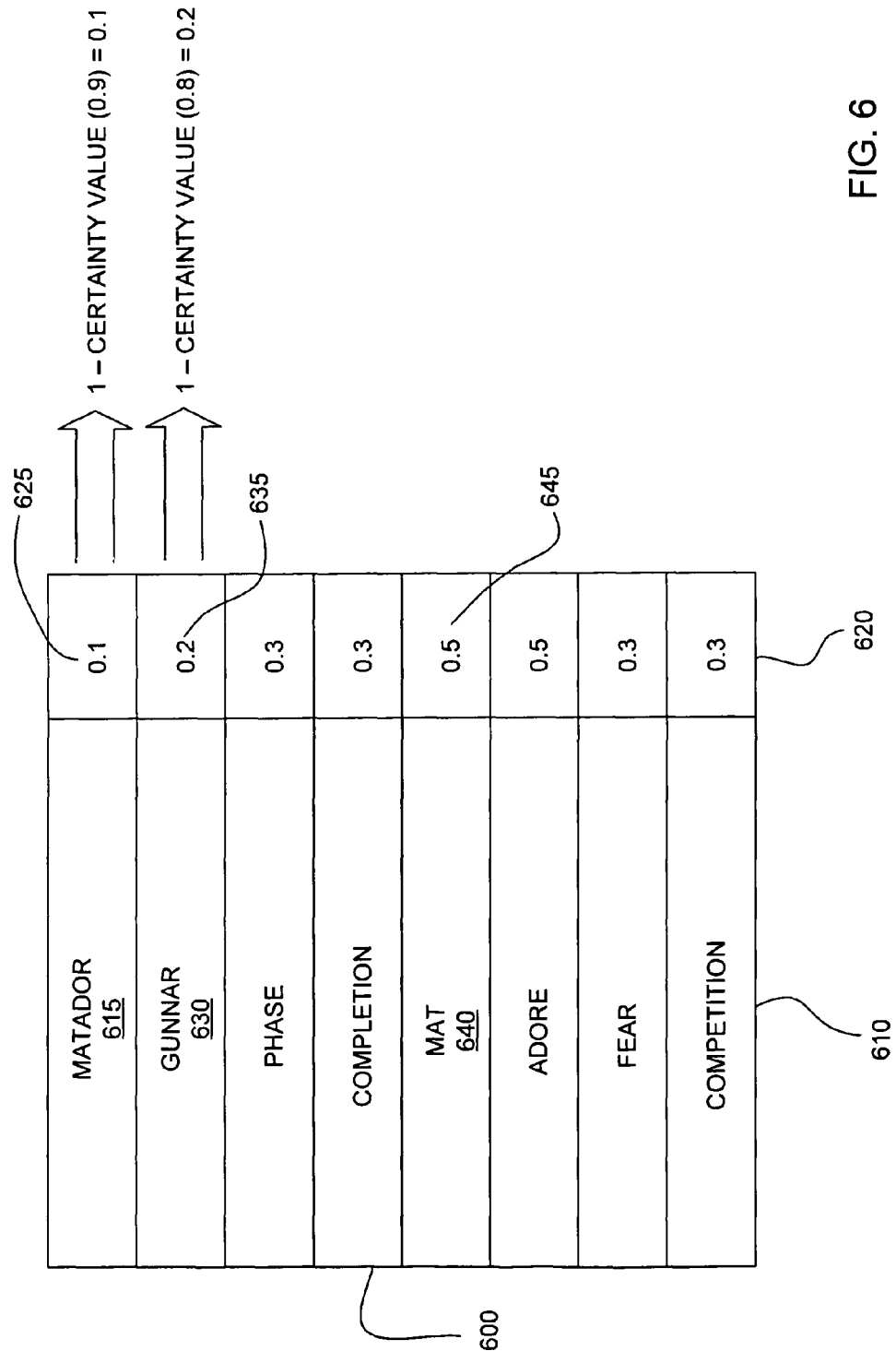
FIG. 6 depicts an embodiment hash table for content words.

Referring to FIG. 6, an embodiment Uncertainty Interval application 160 generated exemplary hash table 600 for the content words of the lattice 420 of FIG. 4B. The hash table 600 contains an entry for each content word 610 which has an uncertainty value 620 for the content word 610. As noted, in an embodiment the uncertainty value 620 for the first occurrence of a content word 610 in a monitored communication is one (1) minus the certainty value of the content word 610 established by the SR Engine 150.

For example, referring to FIG. 4B, the certainty value 441 for the word "Matador," node 421, is nine-tenths (0.9). Thus, as can be seen in FIG. 6, the uncertainty value 625 for the word "Matador" 615, corresponding to node 421 of lattice 420, is one (1) minus nine-tenths (0.9), which equals one-tenth (1−0.9=0.1). As a second example, again referring to FIG. 4B, the certainty value 442 for the word "Gunnar," node 423, is eight-tenths (0.8). As can be seen in FIG. 6, the uncertainty value 635 for the word "Gunnar" 630, corresponding to node 423 of lattice 420, is one (1) minus eight-tenths (0.8), which equals two-tenths (1−0.8=0.2).

In an embodiment the uncertainty value 620 for a word of a lattice is a number that indicates how uncertain, or unlikely, it is that the identified word was actually spoken in the analyzed speech component. In an embodiment the smaller the uncertainty value 620, the more likely it is that the identified content word was spoken in the analyzed speech component.

In an embodiment the Uncertainty Interval application 160 can identify phrases within a lattice. For example, if a lattice contains a first node 310 for the word "Seattle," and an adjacent, second node 310, connected to the first node 310 by an arc 320, for the word "Washington," in an embodiment, the Uncertainty Interval application 160 can identify the phrase "Seattle, Wash." from these two nodes 310.

In an embodiment the Uncertainty Interval application 160 treats an identified phrase as one content word and creates one entry for the phrase in the hash table established for the respective monitored communication. In an embodiment, if the certainty value for a first node, e.g. "Seattle," of a phrase is different from the certainty value assigned a second node, e.g., "Washington," of a phrase then the Uncertainty Interval application 160 generates an uncertainty value for the phrase that is one (1) minus the lowest certainty value for nodes of the phrase. For example, assume the node "Seattle" has a certainty value of six-tenths (0.6) and the node "Washington" has a certainty value of eight-tenths (0.8). In this embodiment, the Uncertainty Interval application 160 assigns the phrase "Seattle, Wash." an uncertainty value of one (1) minus the lowest certainty value for the nodes of the phrase, in this case, six-tenths (0.6). The resultant uncertainty value for "Seattle, Wash." is four-tenths (1−0.6=0.4).

In alternative embodiments the Uncertainty Interval application 160 uses other algorithms to assign an uncertainty value to a phrase treated as a content word in its hash table, including, but not limited to, subtracting the highest certainty value for nodes of a phrase from one (1), and subtracting the average of the certainty values for nodes of a phrase from one (1).

In an embodiment the Uncertainty Interval application 160 uses one or more algorithms including, but not limited to, named entity (NE) recognition algorithms that identify, for example, individual and company names, places, and/or establishments, etc., to identify phrases in a lattice. In an embodiment the Uncertainty Interval application 160 can also, or alternatively, use other methods, including, but not limited to, lists and hash tables, to identify phrases in a lattice.

In an embodiment the Uncertainty Interval application 160 establishes a confidence threshold for the content words that may ultimately be passed on to the Search Engine 170 and/or be used to generate tasked documents. In an alternative embodiment an application that uses the speech-based content sensing system 100 establishes the confidence threshold for the content words that may ultimately be passed on to the Search Engine 170 and/or be used to generate tasked documents. In an aspect of this alternative embodiment the application using the speech-based content sensing system 100 establishes the value for the confidence threshold with a call, e.g., SetKeyWordInterest(float minConfidenceThreshold, WORDLIST *pWords) discussed above, in which the min-ConfidenceThreshold parameter is the confidence threshold value to be used by the Uncertainty Interval application 160. In an alternative aspect of this alternative embodiment the application using the speech-based content sensing system 100 can establish the confidence threshold via other methods, including, but not limited to, setting a global confidence threshold parameter.

In an embodiment, if a content word in the hash table, e.g., hash table 600 of FIG. 6, has an uncertainty value that is less than the established confidence threshold the content word is forwarded by the Uncertainty Interval application 160 to the Search Engine 170 and/or is used to generate the tasked relevant document(s). In an alternative embodiment, if a content word in the hash table has an uncertainty value that is less than or equal to the established confidence threshold the Uncertainty Interval application 160 forwards the content word to the Search Engine 170 and/or uses the content word to generate the tasked relevant document(s). In still other alternative embodiments, other relationships between a content word uncertainty value and a confidence threshold are used to determine if and when a content word is forwarded to the Search Engine 170 and/or is used to generate one or more tasked documents.

In an embodiment the exemplary Keywords API previously discussed has a second, GetKeyWords, call:

GetKeyWords(KEYWORDLIST *pKeyWords);

In an embodiment the GetKeyWords call instructs the speech-based content sensing system 100 to return to a calling application, i.e., an application that is calling, or otherwise using, the speech-based content system 100, the content words (KEYWORDLIST *pKeyWords) identified in the lattices for analyzed speech components of a monitored communication.

In an embodiment the GetKeyWords call instructs the speech-based content sensing system 100 to return only the content words identified in the lattices with uncertainty values that meet a predefined condition. In an embodiment the GetKeyWords call instructs the speech-based content sensing system 100 to return only the content words identified in the lattices with uncertainty values that are less than a confidence threshold value established by the minConfidenceThreshold parameter in the SetKeyWordInterest call of the exemplary Keywords API. In an embodiment the GetKeyWords call also instructs the speech-based content sensing system 100 to return the computed uncertainty value for each returned content word.

In alternative embodiments the GetKeyWords call instructs the speech-based content sensing system 100 to return only the content words identified in the lattices that have uncertainty values that meet other predefined conditions, e.g., that are less than or equal to an established confidence threshold, etc.

In an embodiment the speech-based content sensing system 100 of FIG. 1 uses the repetition of content words identified by the SR Engine 150 in a monitored communication to build up the confidence, or, conversely, decrease the uncertainty, that a particular content word was actually spoken. In an embodiment, given hypothesis word e, the approximate probability that e has occurred. i.e., an approximation of the true probability of e's occurrence, is $p_i$:

$$P(e)=p_i$$

and, conversely, the approximate probability that "not e," i.e., ē, has occurred, i.e., the approximate uncertainty that it was e that occurred, is one (1) minus $p_i$:

$$P(\bar{e})=(1-p_i)$$

After n such occurrences of the hypothesis word e are generated by the SR Engine 150 and reviewed by the Uncertainty Interval application 160, the uncertainty that e occurred is:

$$P(\bar{e}) = \sum_{i=1}^{n}(1-p_i)$$

In an embodiment this expression embraces two assumptions. The first assumption is that the events, e, which are the repeated occurrences of a specific content word, are independent. This "independence" assumption is empirically robust as a repeated content word e is more likely to be separated by five (5) or more intervening (content and/or non-content) words while the order of the language models generating the hypothesis(es) containing e is generally shorter, e.g., with trigram language models which use a memory of two (2) past words.

The second assumption is that the node certainty values attached to the lattice containing the hypothesis that includes e are the true probabilities of the nodes.

The series can converge quickly if the confidences, i.e., approximate probabilities $p_i$, are high, and slowly otherwise. In any event, however, the series converges as $$0<p_i<1$$

The time, n, that the series takes to converge is the uncertainty interval. As the uncertainty interval, n, increases towards infinity, the uncertainty that the hypothesis word e might not have occurred converges asymptotically towards zero (0). Furthermore, the uncertainty interval, n, diminishes rapidly if the approximate probability, pi, i.e., the approximate probability of the certainty value of hypothesis word e, is close to one (1).

Figure 7A:
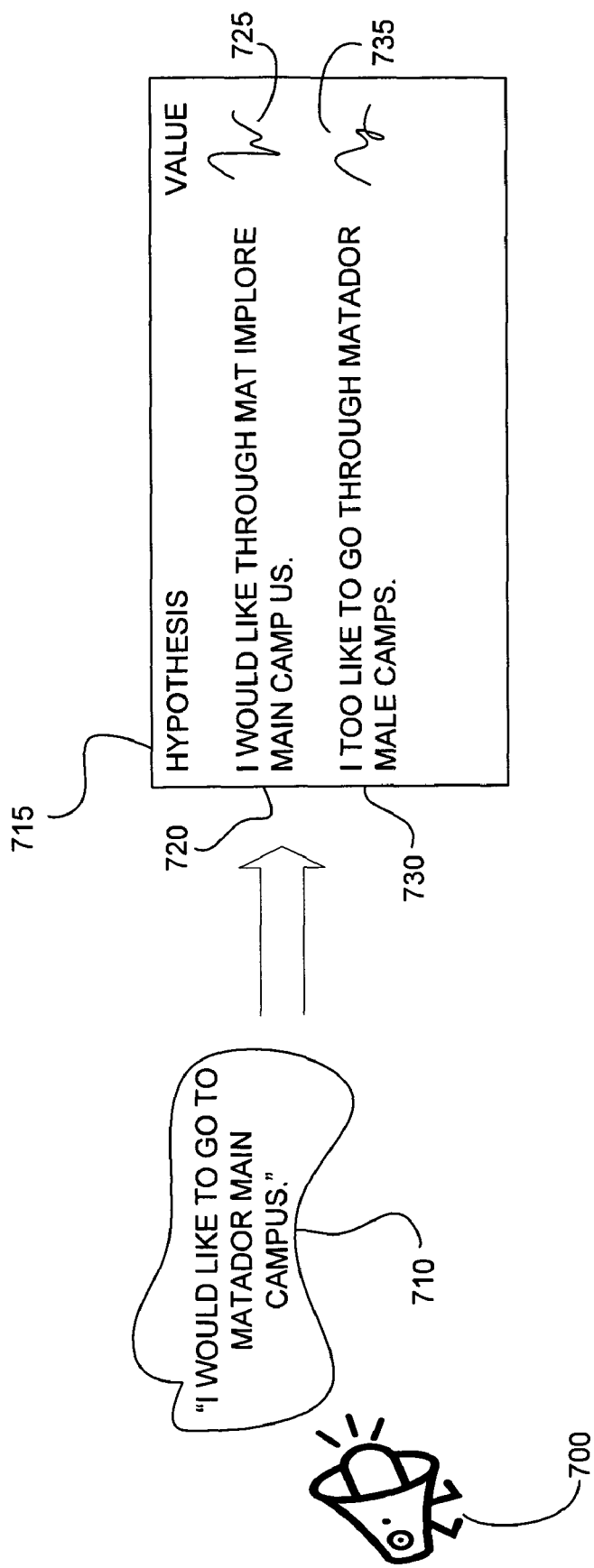
FIG. 7A is an exemplary analysis of a speech component uttered by a computing device user.

For example, and referring to FIG. 7A, assume in the same monitored communication that included the analyzed speech component 405 of FIG. 4A a second analyzed speech component 710 by a speaker 700, "I would like to go to Matador main campus," yields two hypotheses 715, hypothesis 720 and hypothesis 730, from the SR Engine 150. A resultant lattice 740, shown in FIG. 7B, has exemplary certainty values 745 for each node in each of the hypotheses 720 and 730.

Lattice 740 is provided the Uncertainty Interval application 160, which, in an embodiment, strips out, or otherwise ignores, the non-content words, in this example, nodes 741 ("I"), 743 ("like"), 744 ("to"), 746 ("go"), 752 ("us"), and 753 ("too"). The Uncertainty Interval application 160 updates the existing hash table 600 of FIG. 6 for the remaining, new, content words. The Uncertainty Interval application 160 can, thereby, takes advantage of the repetitiveness of content words in determining which ones were likely spoken, and had meaning, in a monitored communication, and consequently, are candidates for further processing, e.g., to be passed on to the Search Engine 170 and/or to be used to generate one or more tasked documents.

Referring to FIG. 7C, the exemplary hash table 760 is an updated hash table 600 of FIG. 6 that now includes entries for the content words from the second analyzed speech component 710. In an embodiment new entries are not added to an existing hash table for content words that already exist in the hash table. In an embodiment the Uncertainty Interval application 160 uses the pseudo-code algorithm 800 of FIG. 8 to generate an updated uncertainty value for content words from a current lattice, e.g., lattice 740 of FIG. 7B, that already have entries in the Uncertainty Interval application's hash table, e.g., hash table 600 of FIG. 6. The pseudo-code algorithm 800 of FIG. 8 embodies the concepts of the uncertainty interval algorithms, P(e) and P($\bar{\text{e}}$), discussed above.

As an example, the word Matador 615 is node 421 in the lattice 420 of FIG. 4B for a first analyzed speech component 405 of FIG. 4A of a communication, and has an entry in the hash table 600 of FIG. 6. Matador 615 is also node 754 of the lattice 740 of FIG. 7B for a second analyzed speech component 710 of FIG. 7A of the same monitored communication. In an embodiment, using the algorithm 800 of FIG. 8 the Uncertainty Interval application 160 generates an updated uncertainty value 765 (value 0.02) upon the second occurrence of Matador 615 in the monitored communication.

Figure 7B:
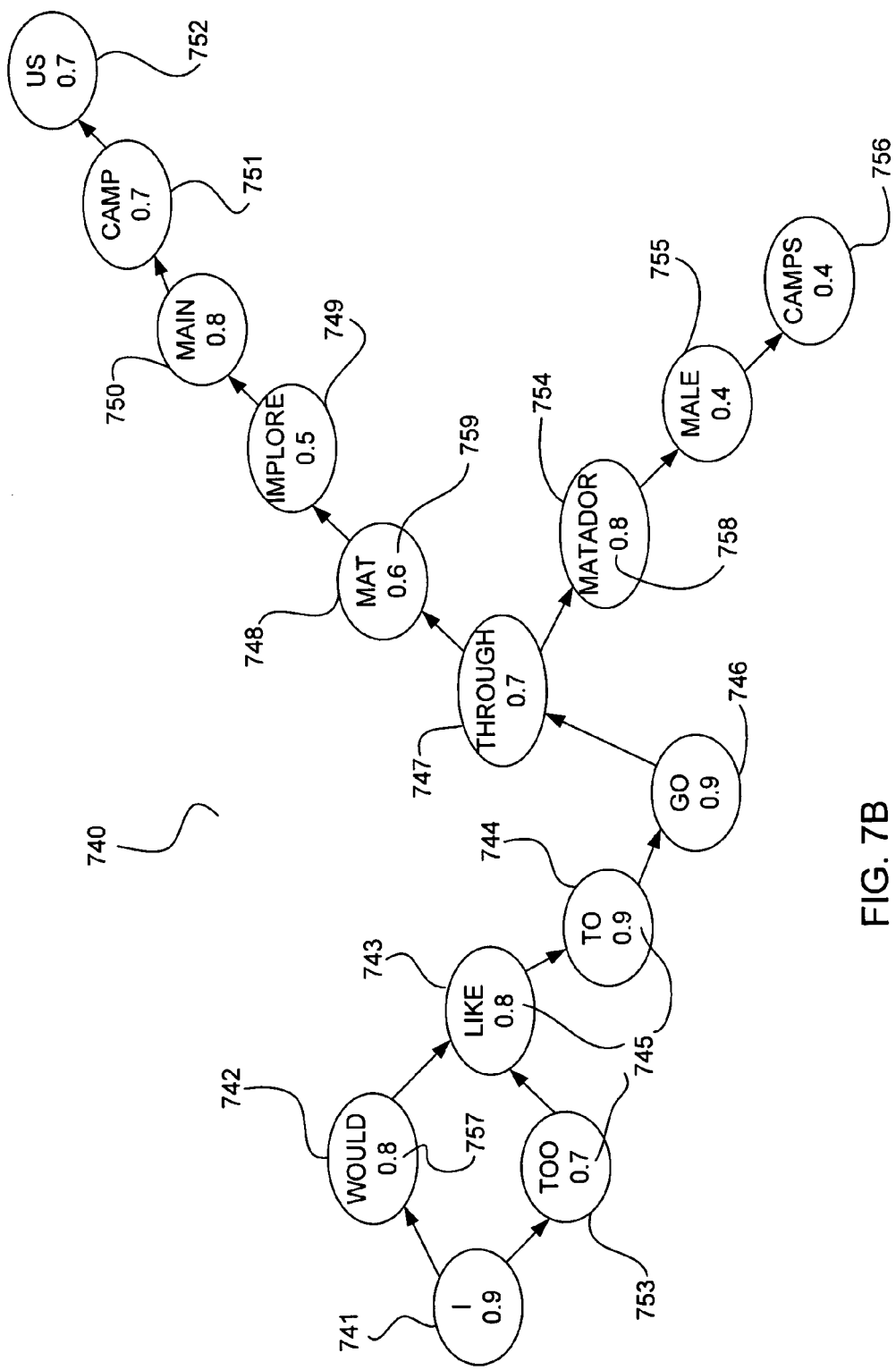
FIG. 7B depicts an exemplary lattice produced by an embodiment Speech Recognition Engine for the analyzed speech component of FIG. 7A.

Referring to lattice 740 of FIG. 7B, Matador 615, node 754, was assigned a certainty value 758 of eight-tenths (0.8) by the SR Engine 150 for the second analyzed speech component 710 of FIG. 7A. The uncertainty value for this second occurrence of Matador 615 is one minus the certainty value (1−0.8), which equals two-tenths (0.2). The first uncertainty value 625 for Matador 615, shown in the hash table 600 of FIG. 6, is one-tenth (0.1). Using the algorithm 800 the new, updated, uncertainty value 765 (value 0.02) for the word Matador 615 that is stored in the hash table 760 is the result of the multiplication of the uncertainty value (0.1) for the first occurrence of Matador 615, from speech component 405, and the uncertainty value (0.2) for the second occurrence of Matador 615, from speech component 710:

$$1^{ST}\text{ UNCERTAINTY VALUE }(0.1)\times 2^{ND}\text{ UNCERTAINTY VALUE }(0.2)=0.02$$

As another example, the word mat 640 is node 430 in the lattice 420 of FIG. 4B for a first analyzed speech component 405 of FIG. 4A of a communication, and has an entry in the hash table 600 of FIG. 6. The word mat 640 is also node 748 of the lattice 740 of FIG. 7B for a second analyzed speech component 710 of FIG. 7A of the same monitored communication. In an embodiment, using the algorithm 800 of FIG. 8 the Uncertainty Interval application 160 generates an updated uncertainty value 770 (value 0.2) upon the second occurrence of mat 640 in the monitored communication.

Referring to lattice 740 of FIG. 7B, mat 640, node 748, was assigned a certainty value 759 of six-tenths (0.6) by the SR Engine 150 for the second analyzed speech component 710 of FIG. 7A. The uncertainty value for this second occurrence of mat 640 has a value of one minus the certainty value (1−0.6), which equals four-tenths (0.4). The first uncertainty value 645 for mat 640, shown in the hash table 600 of FIG. 6, is five-tenths (0.5). Using the algorithm 800 the new, updated, uncertainty value 770 (value 0.2) for the word mat 640 that is stored in the hash table 760 is the result of the multiplication of the uncertainty value (0.5) for the first occurrence of mat 640, from speech component 405, and the uncertainty value (0.4) for the second occurrence of mat 640, from speech component 710:

$$1^{ST}\text{ UNCERTAINTY VALUE }(0.5)\times 2^{ND}\text{ UNCERTAINTY VALUE }(0.4)=0.2$$

In both these examples repetitive content words were assigned lower uncertainty values as a result of their repetition. For example, Matador 615 had a first uncertainty value 625 of one-tenth (0.1) and a second uncertainty value of two-tenths (0.2). Yet, as a result of the use of the algorithm 800, the repetitiveness of the word Matador 615 in two analyzed speech components of a communication yields an uncertainty value 765 of two one-hundreds (0.02).

Likewise, the repetition of mat 640 also yields a lower uncertainty value. Mat 640 had a first uncertainty value 645 of five-tenths (0.5) and a second uncertainty value of four-tenths (0.4). As a result of the use of the algorithm 800 the repetition of the word mat 640 in two analyzed speech components of a communication yields a lower uncertainty value, uncertainty value 770 of just two-tenths (0.2).

At this juncture, if the confidence threshold established by the Uncertainty Interval application 160 is one-tenth (0.1) then in an embodiment the Uncertainty Interval application 160 now forwards the word Matador 615 to the Search Engine 170 and/or identifies it for use, or potential use, in generating one or more tasked documents, as its uncertainty value 765 is less than the confidence threshold.

Referring to the exemplary hash table 760 of FIG. 7C again, in an embodiment, for the content words newly added to the hash table, e.g., would 772, through 774, implore 776, etc., the Uncertainty Interval application 160 assigns them an uncertainty value of one (1) minus the certainty value assigned their respective nodes 310 by the SR Engine 150:

$$\text{UNCERTAINTY VALUE}=1-\text{CERTAINTY VALUE}$$

Thus, for example, would 772 is assigned an uncertainty value 773 of two-tenths (0.2) in hash table 760, which is one minus its certainty value 757 of eight-tenths (1−0.8=0.2).

In an embodiment the uncertainty value for a content word remains the same for those content words in a hash table that are not repeated in a subsequent analyzed speech component of a communication, i. e., that have no nodes in a subsequent lattice provided the Uncertainty Interval application 160 by the SR Engine 150. For example, the word Gunnar 630 has an uncertainty value 635 of two-tenths (0.2) in the hash table 600 of FIG. 6. As Gunnar 630 does not have a respective node in the lattice 740 of FIG. 7B for the subsequent speech component 710 of the same communication, the uncertainty value 635 for Gunnar remains set at two-tenths (0.2) in the hash table 760 of FIG. 7C.

In an embodiment, if the same content word appears twice in one lattice, i.e., a hypothesis contends that the same content word occurred twice in one analyzed speech component, then the Uncertainty Interval application 160 takes advantage of this repetitiveness in one lattice. For example, and referring again to FIG. 5, the word Seattle appears twice in the lattice 500, at node 510 and again at node 520. In an embodiment Seattle is a content word and the Uncertainty Interval application 160 includes it in the hash table it creates for the respective monitored communication. Upon analyzing node 510, the Uncertainty Interval application 160 creates an entry in a hash table for the word Seattle and assigns it an uncertainty value of one (1) minus its certainty value 530:

$$\text{UNCERTAINTY VALUE (SEATTLE)}=1-X$$

Figure 8:
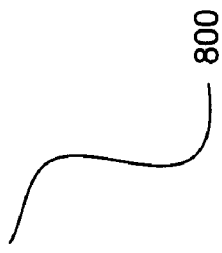
FIG. 8 is an embodiment pseudo-code algorithm for updating the uncertainty value of a content word that appears more than once in one or more analyzed speech components of a monitored communication.

Upon the second occurrence of the word Seattle, at node 520, the Uncertainty Interval application 160 uses the algorithm 800 of FIG. 8 to update the uncertainty value for the Seattle entry in its hash table:

$$\text{SECOND NODE (520) UNCERTAINTY VALUE (SEATTLE)}=1-Y$$

$$\text{UPDATED UNCERTAINTY VALUE (SEATTLE)}=(1-X)\times(1-Y)$$

When content words such as Seattle in the prior example repeat relatively close together, e.g., less than five (5) words apart in a hypothesis, then the independence assumption for the series conversion expression could be weakened by joint probability distributions that may be employed in the language models, e.g., trigram language models, used to generate the hypothesis by the SR Engine 150.

Seattle, nodes 510 and 520 of lattice 500 of FIG. 5, come from hypothesis 230 "Seattle? Okay, I think Seattle . . . " and hypothesis 240 "Seattle? Oh hay, I drink Seattle . . . " of FIG. 2. In both hypotheses 230 and 240 the first occurrence of Seattle and the second occurrence of Seattle are separated by no more than four (4) intervening words. In an embodiment however, content words rarely occur in a hypothesis this close together, and thus, if they do the independence assumption is still applied to the series conversion expression for the generation of the content word's uncertainty value.

In an embodiment, as well as identifying non-content words in a lattice, or, alternatively, content words in the lattice, the Uncertainty Interval application 160 performs other pre-processing on the nodes, i.e., words, of a lattice prior to establishing, or updating, the hash table for a monitored communication, including, but not limited to, stemming. In an embodiment stemming is a technique for determining that two or more words have the same stem, i.e., that two or more words are variations of the same word.

For example, the words "Matador" and "Matador's" are variations of "Matador". By using stemming the Uncertainty Interval application 160 can determine that "Matador's" is a variation of "Matador," and thereby use a subsequent occurrence of "Matador's" to decrease the uncertainty or, conversely, increase the certainty, that the word "Matador" is a subject of a monitored communication. As another example, by employing stemming in an embodiment the Uncertainty Interval application 160 can use subsequent occurrences of the words "rain," "raining," and "rained" to decrease the uncertainty that the word "rain" is a subject of a monitored communication.

In an embodiment the Uncertainty Interval application 160 uses additional mechanisms and/or algorithms to determine which, if any, content words to forward onto the Search Engine 170 and/or use to create one or more tasked documents, including, but not limited to, named entity (NE) recognition algorithms that identify, for example, dates, individual and company names, places, and/or establishments, etc., and heuristic algorithms based on, for example, word class, i.e., noun, verb, etc., and/or word length, etc.

In an embodiment the Uncertainty Interval application 160 reviews the lattices generated by the SR Engine 150 and makes a determination as to whether content words in a lattice that otherwise meet the established conditions for being passed onto the Search Engine 170 are appropriate to be used in, e.g., an internet search whose results will be presented to one or more individuals. For example, if a lattice generated by the SR Engine 150 includes the words "died" and "funeral" the analyzed speech may concern a death. In this embodiment and example, the Uncertainty Interval application 160 refrains from using the lattice containing these words, i.e., inappropriate content words, to determine any content words to forward to the Search Engine 170 and/or use to create tasked documents based on the communication.

In an alternative embodiment, upon noting one or more inappropriate content words in a lattice derived for an analyzed speech component of a monitored communication, the Uncertainty Interval application 160 refrains from forwarding any content words of the current lattice and any subsequent lattice derived from an analyzed speech component of the same monitored communication to the Search Engine 170 and/or using any such content words to generate tasked documents based on the communication.

In an embodiment the Uncertainty Interval application 160 uses a list of inappropriate words to determine if a lattice contains one or more inappropriate content words. In alternative embodiments, other methods for identifying inappropriate content words are used, including, but not limited to, hash tables.

In yet another alternative embodiment the Uncertainty Interval application 160 forwards all content words with an uncertainty value meeting a predefined requirement, e.g., less than the established confidence threshold, to the Search Engine 170 and/or uses these content words to create one or more tasked documents based on the monitored communication.

In an alternative embodiment the functionality of the Uncertainty Interval application 160 is combined with and performed by the SR Engine 150. In this alternative embodiment the SAPI 140 forwards any content words identified to be used for a search directly to the Search Engine 170. In this alternative embodiment the SR Engine 150 generates any tasked documents based on a monitored communication.

In yet another alternative embodiment the functionality of the Uncertainty Interval application 160 is combined with and performed by the SAPI 140. As with the prior alternative embodiment, in this alternative embodiment the SAPI 140 forwards the content words identified to be used for a search directly to the Search Engine 170. In this alternative embodiment the SAPI 140 generates the tasked document(s).

In still other alternative embodiments the functionality of the Uncertainty Interval application 160 is combined with and performed by one or more other components of the speech-based content sensing system 100. For example, in one such other alternative embodiment portions of the functionality of the Uncertainty Interval application 160 are combined with and performed by the SR Engine 150 and other portions of the functionality of the Uncertainty Interval application 160 are combined with and performed by the SAPI 140.

Figure 9:
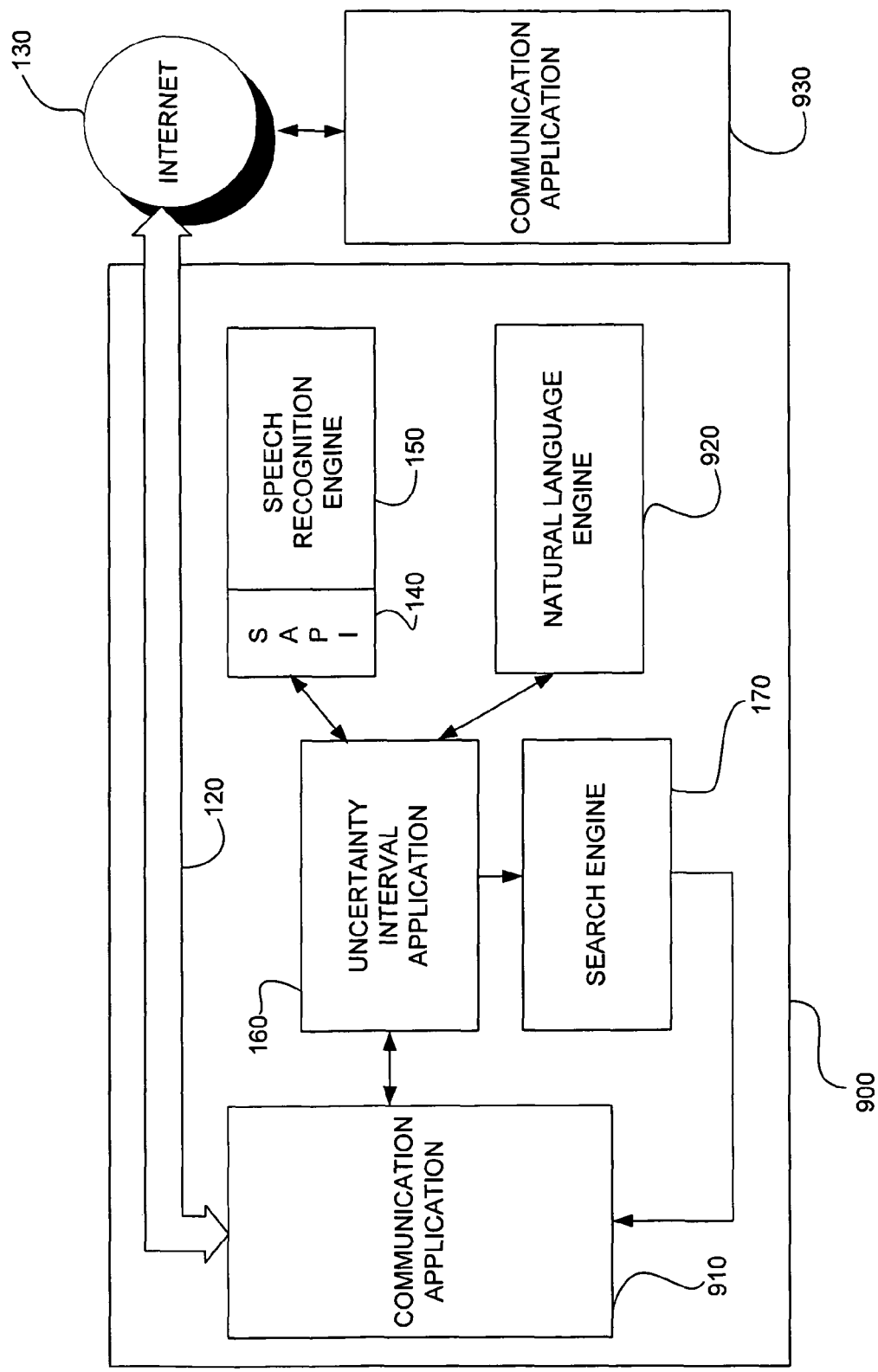
FIG. 9 is an embodiment text-based content sensing system.

Referring to FIG. 9, an embodiment text-based content sensing system 900 is an automatic, silent system for sensing relevant words from text, e.g., text in an email or instant messaging, and text and audio or audio/visual from, e.g., an email or instant messaging. The communication application 910, for example, but not limited to, MSN Messenger®, manages the communication, such as an email or instant messaging, from a user of the device that is running, or otherwise accessing, the communication application 910, i.e., the computing device user associated with the communication application 910.

In an embodiment the communication application 910 transmits a computing device user's communication via a data channel 120, such as, but not limited to, a PCM data channel 120, and the internet 130 to one or more computing devices. In an embodiment the communication application 910 also forwards the unedited text of a computing device user's communication to the Uncertainty Interval application 160 of the text-based content sensing system 900. In an embodiment the Uncertainty Interval application 160 can also, or alternatively, receive audio and/or audio/visual from the communication application 910.

In an embodiment the data channel 120 transmits other individual(s)', i.e., other computing device user(s)', communications to the communication application 910, which, in turn, forwards these communications to the Uncertainty Interval application 160. In this manner, the text in an email or instant messaging, and text and audio or audio/visual from, e.g., an email or instant messaging, of other individuals involved in a communication with the computing device user associated with the communication application 910 is also processed by the text-based content sensing system 900.

In an embodiment the Uncertainty Interval application 160 forwards the text portions of a monitored communication from the communication application 910 to a Natural Language (NL) engine 920 for processing and identifying the words and/or phrases in the communication. In an embodiment the Uncertainty Interval application 160 forwards the audio and audio/visual portions of a monitored communication from the communication application 910 to a SAPI 140 associated with an SR Engine 150 for processing and identifying the words and/or phrases in the communication. In an alternative embodiment, the audio and audio/visual portions of a monitored communication are forwarded from the communication application 910 and/or a communication application 930 to the SAPI 140 associated with the SR Engine 150 via data channel 120.

The NL Engine 920 functions to identify the text, i.e., the words and/or phrases, in the unedited text from the communication application 910. In an embodiment the NL Engine 920 analyzes text components as it receives them from the Uncertainty Interval application 160. In an embodiment a text component is a segment of a monitored text communication, such as an email or instant message, e.g., a sentence, a combination of sentences, a phrase, a word, etc. In an embodiment a text component can be the entire monitored text, for example, a complete email transmission.

In an embodiment the NL Engine 920 generates one or more hypotheses for an analyzed text component. In an embodiment a hypothesis is a determination the NL Engine 920 renders for a particular analyzed text component.

In an embodiment the NL Engine 920 creates a lattice of the hypotheses it generates for an analyzed text component and forwards, or otherwise provides, the lattice to the Uncertainty Interval application 160. In an embodiment the NL Engine 920 includes node certainty values with the generated lattice. In an embodiment the NL Engine 920 includes arc certainty values with the generated lattice. In an embodiment the NL Engine 920 includes, or otherwise forwards or provides, a hypothesis confidence score for each hypothesis it forwards, or otherwise provides, to the Uncertainty Interval application 160.

As noted, in an embodiment the text-based content sensing system 900 includes a SAPI 140 and an SR Engine 150 for handling audio and/or audio/visual communications. Embodiments of a SAPI 140 and an SR Engine 150 have been previously discussed.

Embodiments of the Uncertainty Interval application 160, including the Uncertainty Interval application 160's processing of lattices generated from analyzed components of monitored communications, have been previously discussed. Embodiments of the Search Engine 170 have also been discussed above.

In an alternative embodiment the functionality of the Uncertainty Interval application 160 is combined with and performed by the SR Engine 150 (for audio and audio/visual communications) and the NL Engine 920 (for text communications). In this alternative embodiment the SAPI 140 and the NL Engine 920 forward, or otherwise provide, the content words identified to be used for a search directly to the Search Engine 170. In aspects of this alternative embodiment either the SR Engine 150 or the NL Engine 920 generates the tasked documents based on the monitored communications, with the SR Engine 150 or the NL Engine 920 that is not tasked with generating documents forwarding, in the SR Engine 150's case, via its SAPI 140, identified content words to the SR Engine 150 or NL Engine 920 that is tasked with generating documents.

In yet another alternative embodiment the functionality of the Uncertainty Interval application 160 is combined with and performed by the SAPI 140 (for audio and audio/visual communications) and the NL Engine 920 (for text communications). As with the prior alternative embodiment, in this alternative embodiment the SAPI 140 and the NL Engine 920 forward, or otherwise provide, the content words identified to be used for a search directly to the Search Engine 170. In aspects of this alternative embodiment either the SAPI 140 or the NL Engine 920 generates the tasked documents based on the monitored communications, with the SAPI 140 or the NL Engine 920 that is not tasked with generating documents forwarding identified content words to the SAPI 140 or the NL Engine 920 that is tasked with generating documents.

In still other alternative embodiments the functionality of the Uncertainty Interval application 160 is combined with and performed by one or more other components of the text-based content sensing system 900. For example, in one such other alternative embodiment portions of the functionality of the Uncertainty Interval application 160 for handling audio and audio/visual communications are combined with and performed by the SR Engine 150 and other portions of the functionality of the Uncertainty Interval application 160 for handling audio and audio/visual communications are combined with and performed by the SAPI 140, while portions of the functionality of the Uncertainty Interval application 160 for handling text communications are combined with and performed by the NL Engine 920.

In an embodiment any search results, i.e., web link(s), based on content words passed to the Search Engine 170 that are forwarded to the communication application 910 are presented to the computing device user associated with the communication application 910.

In an embodiment, if the monitored communication is between two or more computing device users, the communication application 910 forwards the search results on the data channel 120 to the communication applications 930 associated with other individuals involved in, or otherwise associated with, the communication, in order that the search results can be presented to these other individuals by their respective communication applications 930.

In an embodiment the Uncertainty Interval application 160 determines what, if any, words and/or phrases from lattices generated by the NL Engine 920 and/or the SR Engine 150 to use in creating one or more tasked documents. In an embodiment, if the text-based content sensing system 900 is tasked with generating one or more documents from a monitored communication, at the end of the monitored communication the Uncertainty Interval application 160 generates the documents from various content words identified from the analyzed components of the monitored communication and provides the generated documents to the communication application 910.

In an alternative embodiment, if the text-based content sensing system 900 is tasked with generating one or more documents from a monitored communication, the Uncertainty Interval application 160 works on generating the tasked documents as relevant content words are identified from the analyzed components of the monitored communication. In this alternative embodiment, at the end of the monitored communication, when the tasked documents are generated, the Uncertainty Interval application 160 provides them to the communication application 910.

In an embodiment the communication application 910 displays the generated documents to the computing device user associated with the communication application 910. In an alternative embodiment the communication application 910 provides an indication, such as, but not limited to, a pop-up window on the user's computing device display, that informs the user associated with the communication application 910 that one or more documents were created and where they are stored for access by the user.

In an embodiment, if one or more individuals other than the computing device user associated with the communication application 910 are involved in, or otherwise have access to, the monitored communication, the communication application 910 forwards the generated documents on the data channel 120 to the communication applications 930 associated with the other individuals.

In embodiment speech-based content sensing systems, e.g., system 100 of FIG. 1, and embodiment text-based content sensing systems, e.g., system 900 of FIG. 9, all computing device users whose communications are monitored, or who are otherwise associated with any such monitored communications, such as, but not limited to, receiving a monitored communication, are notified of the monitoring and agreement to the monitoring has been procured by each such computing device user.

FIGS. 10A, 10B, 10C, 10D, 10E and 10F illustrate an embodiment logic flow for a methodology for a content sensing system, such as the embodiment speech-based content sensing system 100 of FIG. 1 and the embodiment text-based content sensing system 900 of FIG. 9. While the following discussion is made with respect to systems portrayed herein, the operations described may be implemented in other systems. Further, the operations described herein are not limited to the order shown. Additionally, in other alternative embodiments more or fewer operations may be performed.

Figure 10A:
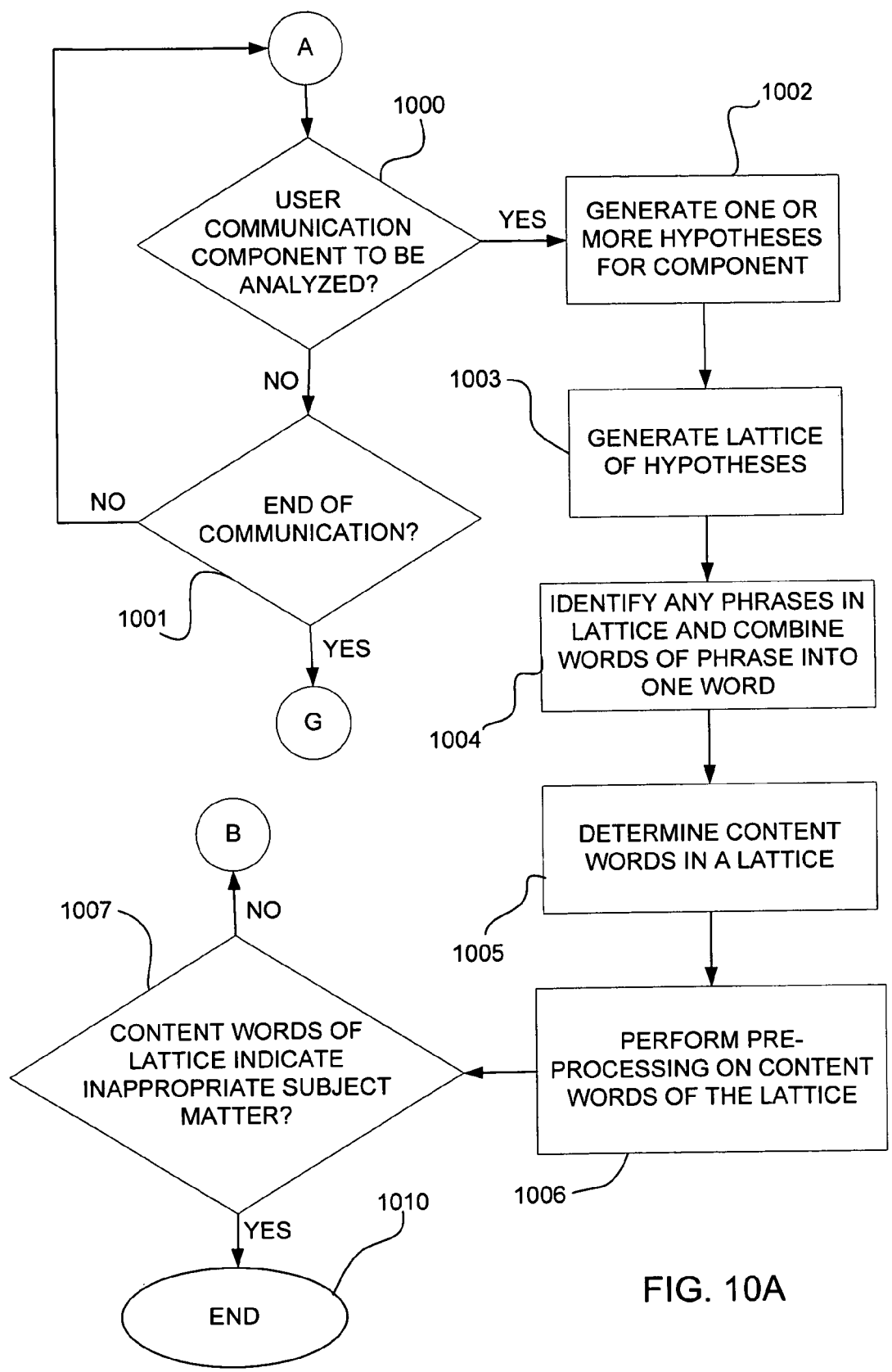
FIGS. 10A, 10B, 10C, 10D, 10E and 10F illustrate an embodiment logic flow for content sensing systems.

In FIG. 10A an embodiment content sensing system makes a determination at decision block 1000 as to whether there is a communication component to be analyzed, i.e., whether there is a component, e.g., sentence, phrase, word, etc., of a user's speech or text communication to be currently analyzed. If yes, the content sensing system generates one or more hypotheses for the analyzed speech component 1002. In an embodiment a confidence value is generated for each hypothesis 1002.

In an embodiment, for a speech-based content sensing system, a Speech Recognition (SR) Engine 150 analyzes the speech component and generates the one or more hypotheses and the confidence value for each hypothesis 1002. In an alternative embodiment, for a text-based content sensing system, if the communication component to be analyzed is text-based then a Natural Language (NL) Engine 920 analyzes the text component and generates the one or more hypotheses and the confidence value for each hypothesis 1002. In this alternative embodiment for a text-based content sensing system, if the communication component to be analyzed is speech-based then an SR Engine 150 analyzes the speech component and generates the one or more hypotheses and the confidence value for each hypothesis 1002.

In an embodiment the content sensing system generates a lattice of the hypotheses created for the analyzed communication component 1003. In an embodiment the generated lattice contains a certainty value for each node of the lattice. In an embodiment the generated lattice contains a certainty value for each arc of the lattice.

In an alternative embodiment the content sensing system generates a lattice of a subset of the hypotheses created for the analyzed communication component 1003. In this alternative embodiment only those hypotheses that will be further processed are included in the generated lattice.

In an embodiment, for a speech-based content sensing system, an SR Engine 150 generates the lattice of hypotheses, or subset of hypotheses, as well as the certainty values for each node and each arc of the lattice 1003. In an alternative embodiment, for a text-based content sensing system, if the analyzed communication component is text-based then an NL Engine 920 generates the lattice of hypotheses, or subset of hypotheses, as well as the certainty values for each node and each arc of the lattice 1003. In this alternative embodiment for a text-based content sensing system, if the analyzed communication component is speech-based then an SR Engine 150 generates the lattice of hypotheses, or subset of hypotheses, as well as the certainty values for each node and each arc of the lattice 1003.

In an embodiment the content sensing system identifies phrases in a lattice and combines the words of the phrase into one word 1004, i.e., further treats the phrase as one word.

In an embodiment the content sensing system determines the content words in a lattice 1005. In one aspect of this embodiment the content sensing system identifies the non-content words in the lattice by, e.g., referring to a list of non-content words, or using numbers assigned to words to identify the non-content words in a lattice. In this aspect the content sensing system deletes or otherwise ignores the non-content words and the remaining words that are not identified as non-content words are the content words of the lattice.

In an alternative aspect of this embodiment the content sensing system determines the content words of a lattice by identifying the content words using, e.g., a list of content words, a hash table of content words, or numbers assigned to words.

In an embodiment the content sensing system performs pre-processing on the lattice nodes representing content words of the hypothesis(es), including, but not limited to, stemming 1006.

In an embodiment, at decision block 1007 the content sensing system determines whether the content words of the current lattice indicate inappropriate subject matter for additional processing, such as internet searches and/or document generation. If yes, in an embodiment the content sensing system ends processing of the currently monitored communication 1010.

Figure 10B:
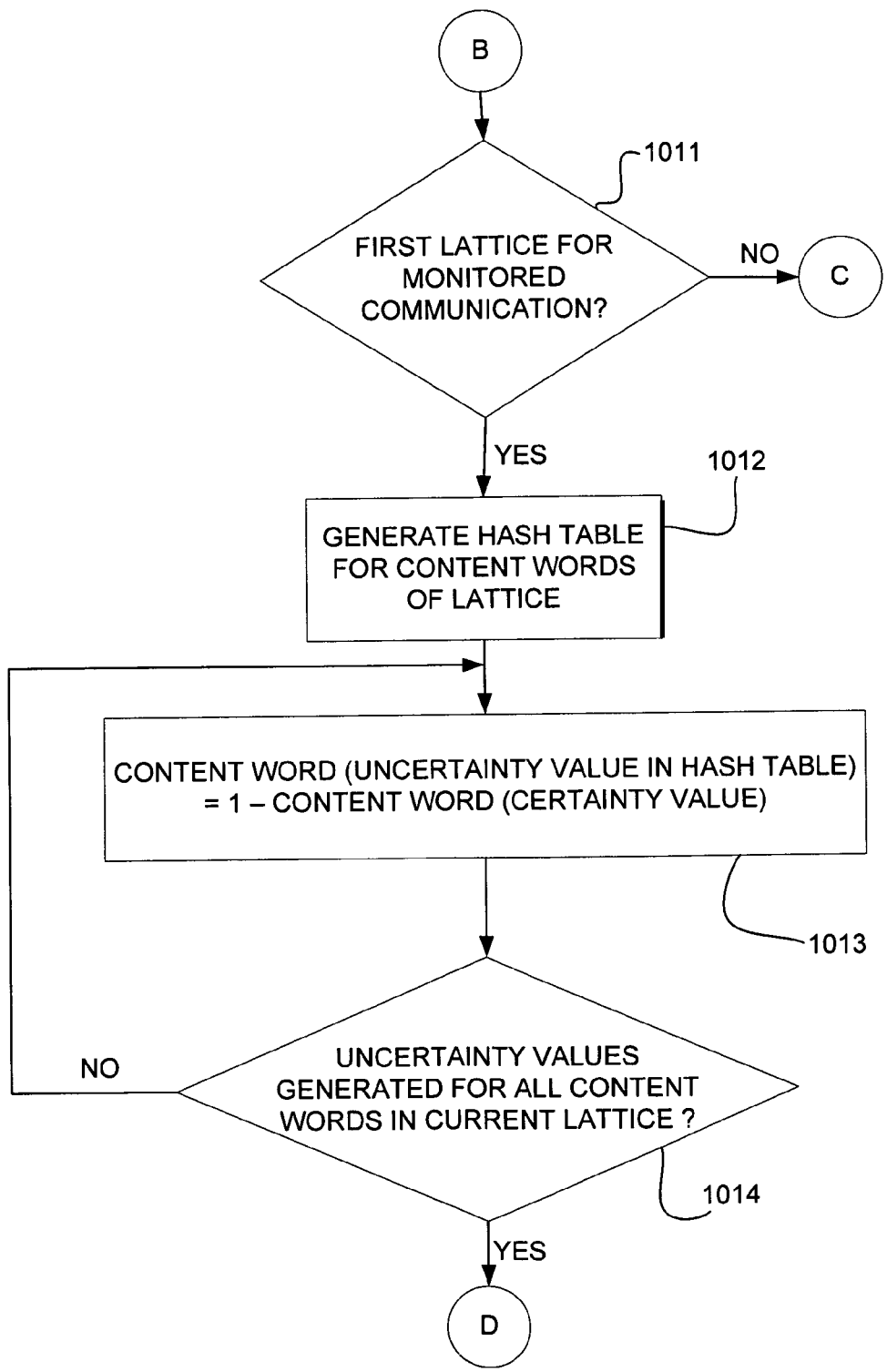

Otherwise, at decision block 1011 of FIG. 10B the content sensing system determines whether or not the current lattice is the first generated lattice for the monitored communication, i.e., whether or not a hash table has been previously established for the currently monitored communication. If the current lattice is a first lattice for the communication then the content sensing system generates a hash table for the content words of the lattice 1012. In an embodiment each content word from this first lattice is assigned an uncertainty value 1013 of one (1) minus the certainty value for the content word in the hash table:

CONTENT WORD(UNCERTAINTY VALUE)=1– CONTENT WORD(CERTAINTY VALUE)

In an embodiment speech-based content sensing system the certainty value for a content word is assigned by an SR Engine 150. In an alternative embodiment text-based content sensing system, if the analyzed communication component is text-based then the certainty value for a content word is assigned by an NL Engine 920. In this alternative embodiment text-based content sensing system, if the analyzed communication component is speech-based then an SR Engine 150 generates the certainty values for the content words of a lattice.

In an embodiment content sensing system an Uncertainty Interval application 160 generates the hash table for a lattice and the respective uncertainty values for the content words of the hash table.

At decision block 1014 a determination is made as to whether an uncertainty value has been generated for all the content words of the current lattice, i.e., whether all the content words of the current lattice have been processed into the hash table. If no, the content sensing system continues to process the content words of the current lattice, calculating an uncertainty value for the next content word 1013.

Figure 10C:
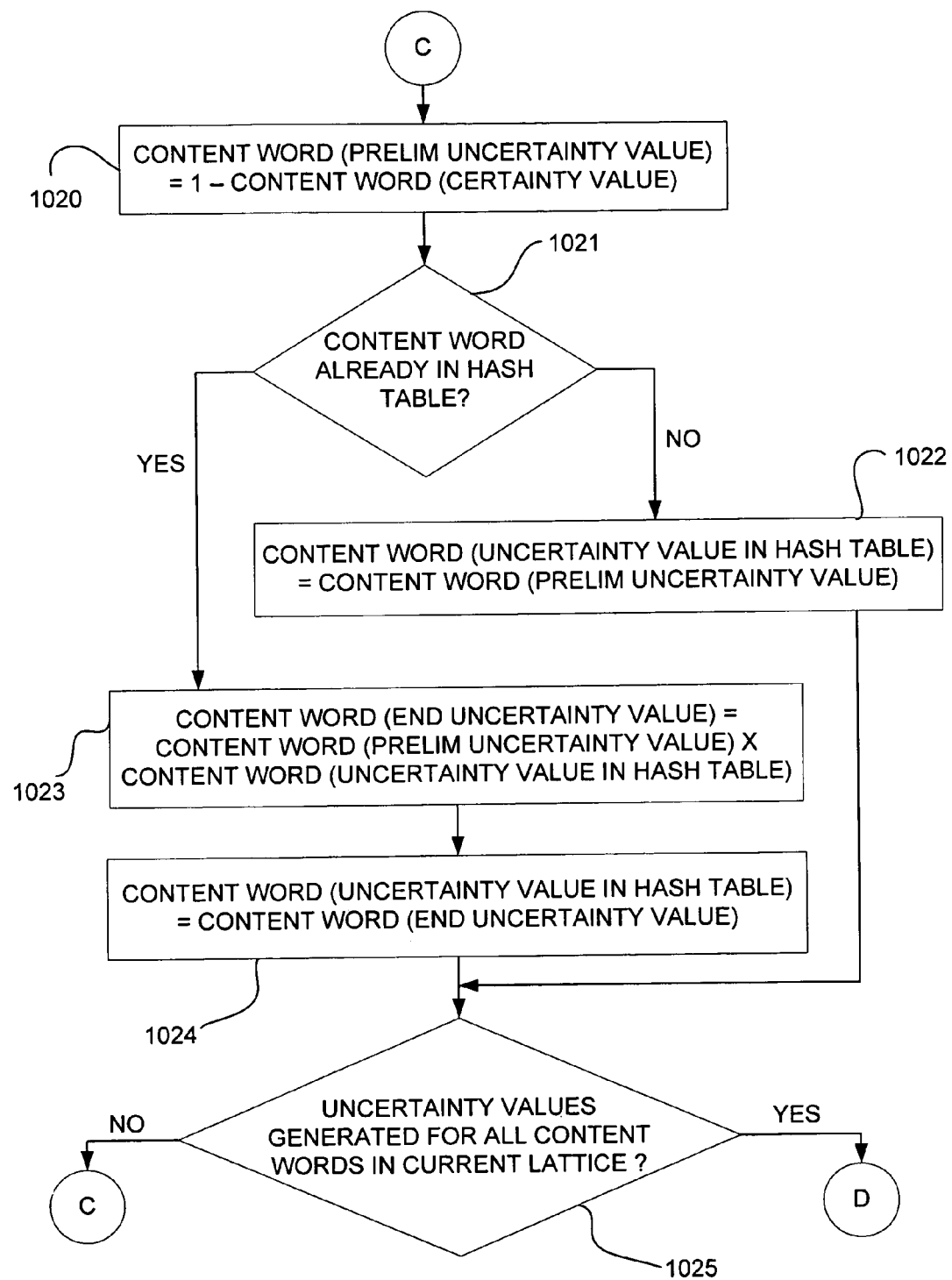
Figure 10D:
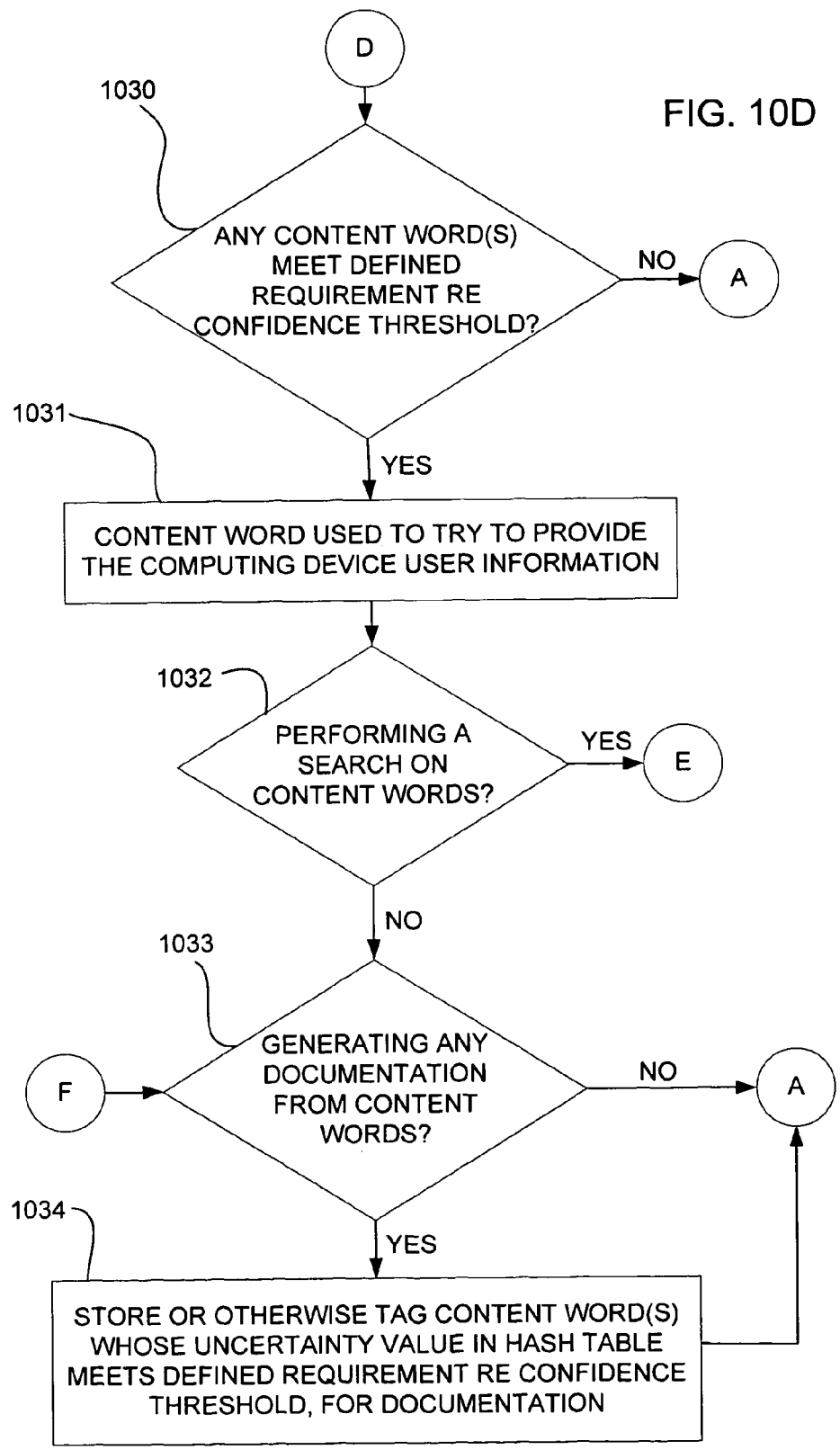

Once uncertainty values for all the content words of the current lattice have been generated, in an embodiment, at decision block 1030 of FIG. 10D a determination is made as to whether one or more content words in the hash table meet a defined requirement in relation to a confidence threshold, such as, but not limited to, have an uncertainty value that is less than an established confidence threshold or have an uncertainty value that is less than or equal to an established confidence threshold. If no, the current lattice has been processed and the content sensing system returns to decision block 1000 of FIG. 10A to determine if there is currently a new communication component to analyze.

Returning back to decision block 1011 of FIG. 10B, if the current lattice is not the first lattice for a monitored communication, i.e., a hash table has been generated for prior analyzed communication components of the currently monitored communication, then as shown in FIG. 10C, in an embodiment the content sensing system assigns each content word a preliminary uncertainty value 1020 of one (1) minus its certainty value:

CONTENT WORD(PRELIMINARY UNCERTAINTY VALUE)=1−CONTENT WORD(CERTAINTY VALUE)

At decision block 1021 a determination is made as to whether the content word currently being processed is already represented in the hash table. If no, i.e., the content word currently being processed is a new content word for the hash table, then in an embodiment the content sensing system generates an entry in the existing hash table for the new content word and assigns the content word an uncertainty value 1022 equal to its preliminary uncertainty value:

CONTENT WORD(UNCERTAINTY VALUE IN HASH TABLE)=CONTENT WORD(PRELIMINARY UNCERTAINTY VALUE)

If at decision block 1021 the content word currently being processed is already represented in the hash table for the monitored communication, e.g., the content word currently being processed was in a prior lattice generated for a prior communication component of the monitored communication, then in an embodiment the content sensing system assigns the content word an end uncertainty value 1023 that is the result of the multiplication of the content word's preliminary uncertainty value and the content word's uncertainty value currently stored in the hash table:

CONTENT WORD(END UNCERTAINTY VALUE)=CONTENT WORD(PRELIMINARY UNCERTAINTY VALUE)×CONTENT WORD (UNCERTAINTY VALUE IN HASH TABLE)

The content sensing system updates the uncertainty value in the hash table for the content word currently being processed to equal the content word's end uncertainty value 1024:

CONTENT WORD(UNCERTAINTY VALUE IN HASH TABLE)=CONTENT WORD(END UNCERTAINTY VALUE)

In an embodiment content sensing system an Uncertainty Interval application 160 computes the preliminary uncertainty value and the end uncertainty value for a content word and stores the end uncertainty value in the hash table for the content word.

At decision block 1025 a determination is made as to whether uncertainty values have been generated for all the content words of the current lattice. If no, the content sensing system continues to process the content words of the current lattice, computing a preliminary uncertainty value for the new current content word being processed 1020.

Once uncertainty values have been generated for all the content words of the current lattice, in an embodiment, at decision block 1030 of FIG. 10D a determination is made as to whether one or more content words in the hash table have an uncertainty value that meets a defined requirement in relation to a confidence threshold, such as, but not limited to, have an uncertainty value that is less than an established confidence threshold. If no, the current lattice has been processed and the content sensing system returns to decision block 1000 of FIG. 10A to determine if there is a new communication component to analyze.

If at decision block 1030 one or more content words of the hash table have an uncertainty value that meets the defined requirement in relation to the confidence threshold then the content sensing system uses these content word(s) to try and provide the computing device user information 1031, e.g., web site search results and/or generated documents from the monitored communication.

At decision block 1032 a determination is made as to whether the content sensing system is performing internet searches for the monitored communication. If no, at decision block 1033 a determination is made as to whether the content sensing system is tasked to generate any documents for the currently monitored communication. If no, the processing of the current lattice is complete and the content sensing system returns to decision block 1000 of FIG. 10A to determine if there is a new communication component to analyze.

If at decision block 1033 it is determined that the content sensing system is tasked to generate one or more documents for the currently monitored communication then in an embodiment the content sensing system stores or otherwise tags the content words in the hash table whose uncertainty value meets the defined requirement in relation to the confidence threshold 1034. In an embodiment the current lattice is deemed processed and the content sensing system returns to decision block 1000 of FIG. 10A to determine if there is a new communication component to analyze.

Figure 10E:
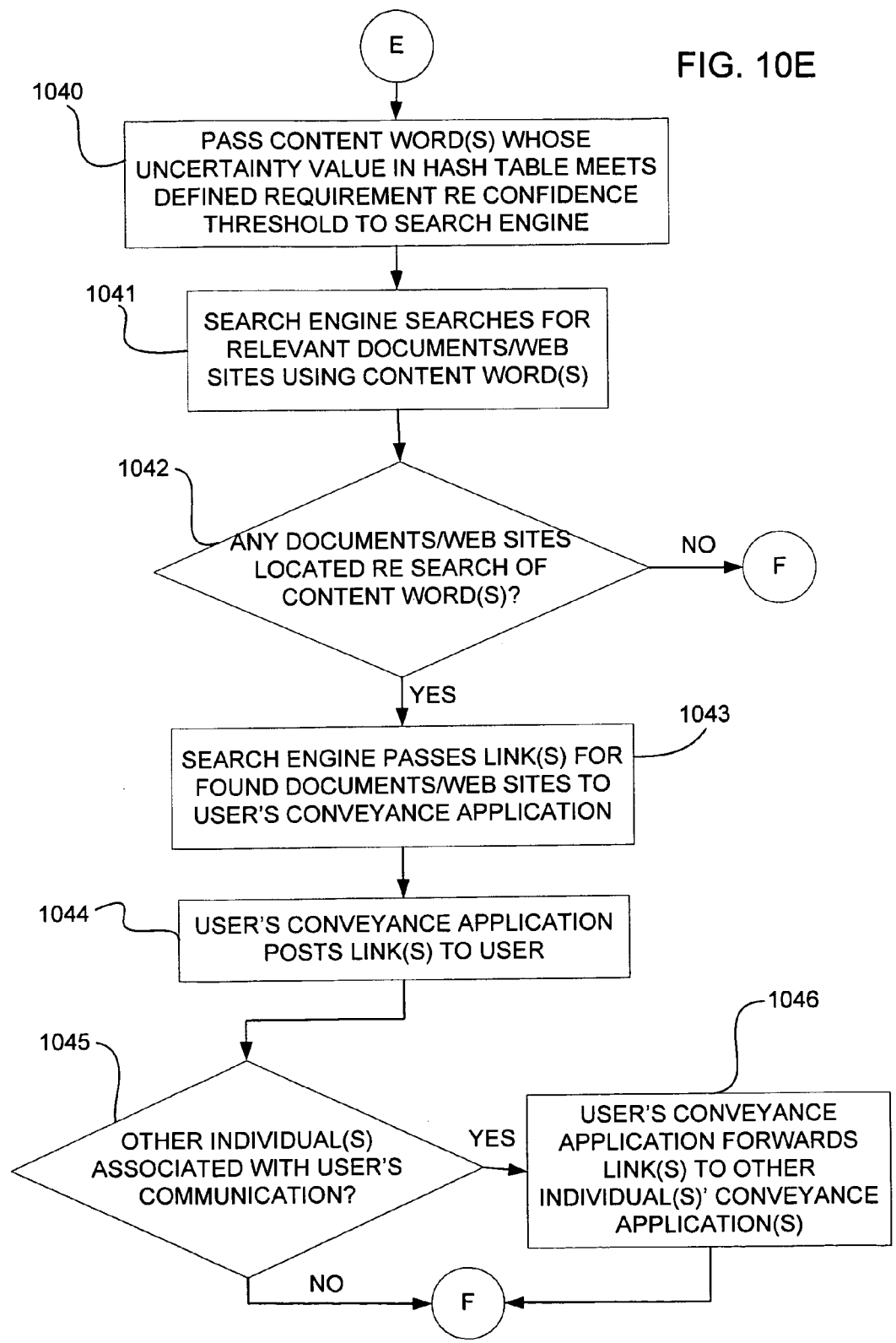

If at decision block 1032 in FIG. 10D it is determined that the content sensing system is tasked with performing internet searches for the currently monitored communication then the content word(s) whose uncertainty value meets the defined requirement in relation to the confidence threshold, i.e., search content word(s), are forwarded, or otherwise made available, to a Search Engine 1040 as shown in FIG. 10E. The Search Engine searches the internet using the search content word(s) for relevant documents and/or web sites 1041.

At decision block 1042 a determination is made as to whether the Search Engine has located any relevant documents and/or web sites using the search content word(s). If no, at decision block 1033 of FIG. 10D a determination is made as to whether the content sensing system is tasked with generating any documents for the currently monitored communication, as discussed above.

If, however, at decision block 1042 of FIG. 10E it is determined that the Search Engine has located one or more relevant documents and/or web sites for the search content word(s) then the Search Engine passes the internet links for the documents and/or web sites to the user's conveyance application 1043. In an embodiment speech-based content sensing system the conveyance application is a VOIP application 110. In an embodiment text-based content sensing system the conveyance application is a communication application 910.

In an embodiment the user's conveyance application posts the internet links it receives from the Search Engine to the user 1044. In an embodiment, at decision block 1045 a determination is made as to whether or not there are other individuals involved in or otherwise associated with the currently monitored communication, for example, but not limited to, whether the currently monitored communication is a VOIP call between two or more individuals. If yes, in an embodiment the user's conveyance application forwards the internet links received from the Search Engine to the other individual(s)' conveyance application(s) 1046.

If there are no other individuals involved in or otherwise associated with the currently monitored communication, or, if there are such individuals their conveyance applications have been sent the internet links for the documents and/or web sites located by the Search Engine, the content sensing system, at decision block 1033 of FIG. 10D, determines whether or not it is tasked with generating one or more documents for the currently monitored communication.

Referring back to FIG. 10A, at decision block 1000 if it is determined there is no user communication component to be analyzed, then at decision block 1001 a determination is made as to whether the currently monitored communication has ended. If no, the content sensing system loops back to decision block 1000 to determine if there is a user communication component to analyze.

Figure 10F:
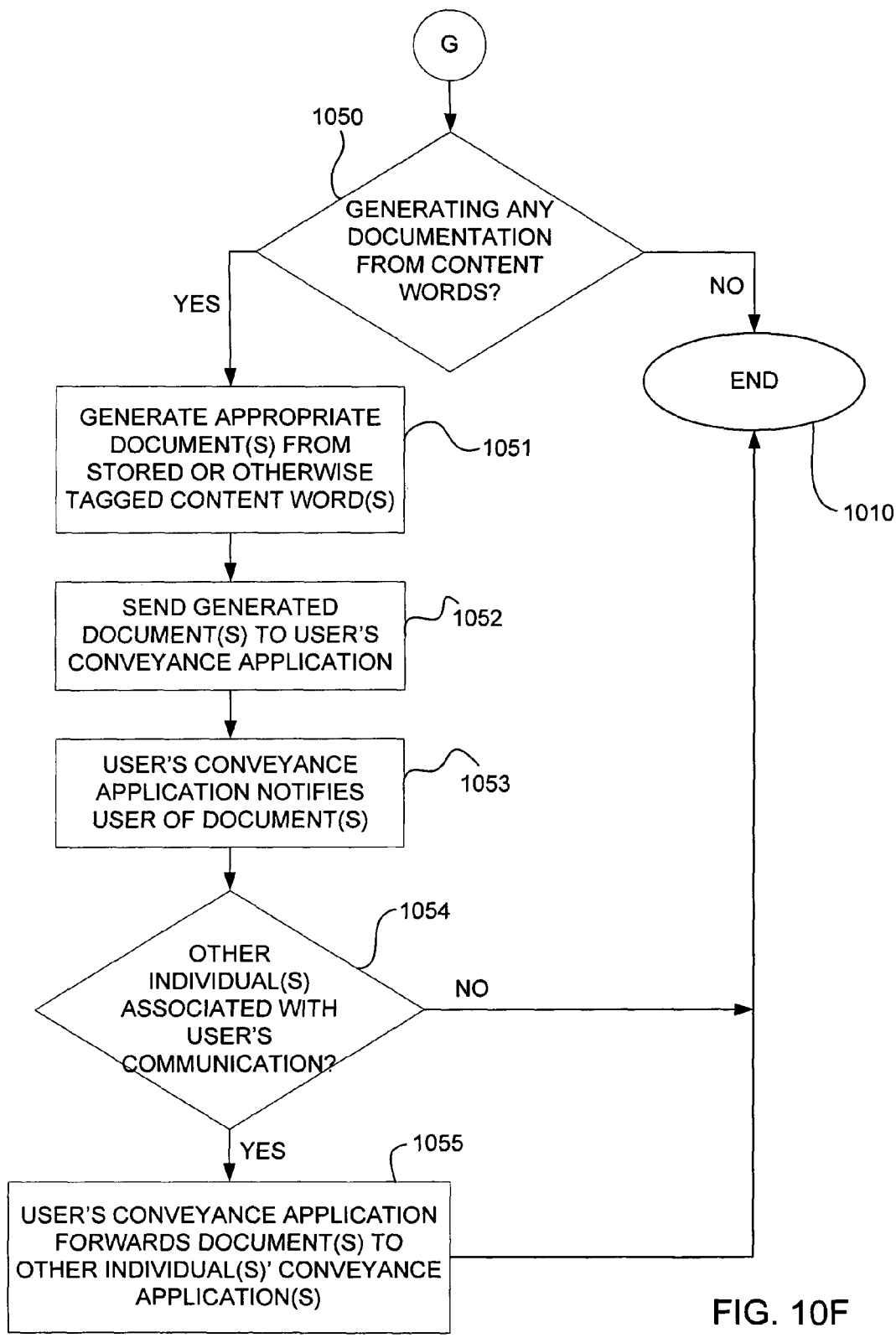

If, however, at decision block 1001 if it is determined that the currently monitored communication has ended, then at decision block 1050 of FIG. 10F a determination is made as to whether the content sensing system is tasked with generating any documents for the communication. If no, in an embodiment the content sensing system ends processing of the communication 1010.

Otherwise, if the content sensing system is tasked with generating one or more documents from the monitored communication then in an embodiment the content sensing system generates the document(s) from the stored, or otherwise tagged, content words in the hash table 105 1, i.e., in an embodiment, from the content words whose uncertainty values met the defined requirement in relation to the confidence threshold. In an embodiment the content sensing system sends the generated document(s) to the user's conveyance application, or otherwise notifies the user's conveyance application of the existence and location of the generated document(s) 1052. The user's conveyance application presents the user the generated document(s), or otherwise notifies the user of the existence of the document(s) 1053.

In an embodiment, at decision block 1054 a determination is made as to whether or not there are other individuals involved in or otherwise associated with the monitored communication, for example, but not limited to, whether the currently monitored communication is a VOIP call between two or more individuals. If yes, in an embodiment the user's conveyance application forwards the generated document(s) to the other individual(s)' conveyance application(s) or otherwise notifies the other individual(s)' conveyance application(s) of the existence and location of the document(s) 1055. In an embodiment the content sensing system then ends processing of the communication 1010.

If there are no other individuals involved in or otherwise associated with the monitored communication, in an embodiment the content sensing system ends processing of the communication 1010.

Alternative Uncertainty INterval Applications

The prior discussion has addressed the application of uncertainty interval algorithms, i.e., the P(e) and P($\overline{e}$) algorithms discussed above, in communication systems, e.g., the embodiment speech-based content sensing system 100 of FIG. 1 and the embodiment text-based content sensing system 900 of FIG. 9. The principles employed in the Uncertainty Interval application 160 can be applied in myriad other systems, and thus other embodiments use the Uncertainty Interval application 160 and/or concepts thereof and the uncertainty interval algorithms in alternative systems.

One such alternative system is a drawing system for constructing images. An exemplary drawing system constructs a three-dimensional (3-D) shape of an object, e.g., an apple, using two dimensional (2-D) images of the object. In this exemplary 3-D drawing system indecision can arise as to how to generate one or more aspects of the 3-D image. For example, shadows and/or ocularities can spawn indecision as to whether a certain part of the object being drawn is convex or concave.

Using principles of the Uncertainty Interval application 160 and the uncertainty interval algorithms the 3-D drawing system stores hypotheses of an aspect of the 3-D image generated from various 2-D images of the object created from different viewing and/or camera angles. Certainty values are associated with each generated hypotheses and/or one or more subsets of each hypothesis. The certainty values are used to generate uncertainty values for the hypotheses and/or one or more subsets of each hypothesis. When a second hypothesis and/or one or more subsets of a second hypothesis matches a first hypothesis and/or one or more subsets of a first hypothesis, the uncertainty value for the first hypothesis, or a subset thereof, and the uncertainty value for the second hypothesis, or a subset thereof, are multiplied together to formulate an accumulated uncertainty value for the hypothesis or a subset thereof. Further matches are treated in a like manner, with the uncertainty value of each further match being multiplied by the current accumulated uncertainty value for the hypothesis or subset thereof. If the accumulated uncertainty value becomes a particular value, e.g., less than an established confidence threshold or less than or equal to an established confidence threshold, the 3-D drawing system uses the associated hypothesis, or subset thereof, to generate the relevant aspect of the 3-D image.

Additional alternative embodiment systems that employ principles explained herein include, but are not limited to, photo restoration systems, picture restoration systems and language deciphering systems.

Computing Device System Configuration

Figure 11:
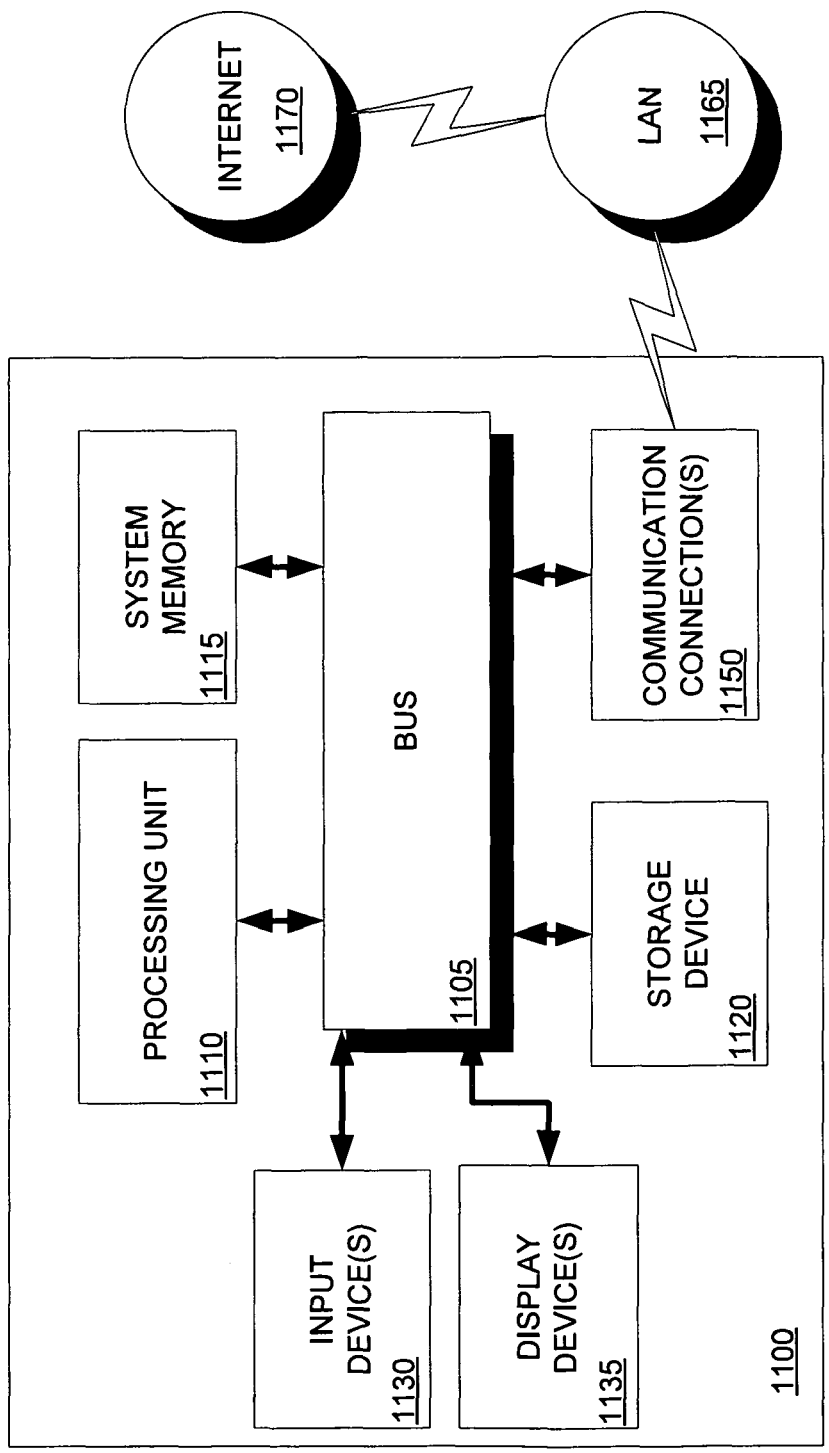
FIG. 11 is a block diagram of an exemplary basic computing device system that can process software, i.e., program code, or instructions.

FIG. 11 is a block diagram that illustrates an exemplary computing device system 1100 upon which an embodiment can be implemented. The computing device system 1100 includes a bus 1105 or other mechanism for communicating information, and a processing unit 1110 coupled with the bus 1105 for processing information. The computing device system 1100 also includes system memory 1115, which may be volatile or dynamic, such as random access memory (RAM), non-volatile or static, such as read-only memory (ROM) or flash memory, or some combination of the two. The system memory 1115 is coupled to the bus 1105 for storing information and instructions to be executed by the processing unit 1110, and may also be used for storing temporary variables or other intermediate information during the execution of instructions by the processing unit 1110. The system memory 1115 often contains an operating system and one or more programs, and may also include program data.

In an embodiment, a storage device 1120, such as a magnetic or optical disk, is also coupled to the bus 1105 for storing information, including program code comprising instructions and/or data.

The computing device system 1100 generally includes one or more display devices 1135, such as, but not limited to, a display screen, e.g., a cathode ray tube (CRT) or liquid crystal display (LCD), a printer, and one or more speakers, for providing information to a computing device user. The computing device system 1100 also generally includes one or more input devices 1130, such as, but not limited to, a keyboard, mouse, trackball, pen, voice input device(s), and touch input devices, which a computing device user can use to communicate information and command selections to the processing unit 1110. All of these devices are known in the art and need not be discussed at length here.

The processing unit 1110 executes one or more sequences of one or more program instructions contained in the system memory 1115. These instructions may be read into the system memory 1115 from another computing device-readable medium, including, but not limited to, the storage device 1120. In alternative embodiments, hard-wired circuitry may be used in place of or in combination with software program instructions. Thus, the computing device system environment is not limited to any specific combination of hardware circuitry and software.

The term "computing device-readable medium" as used herein refers to any medium that can participate in providing program instructions to the processing unit 1110 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 1115 and storage device 1120 of the computing device system 1100 are further examples of storage media. Examples of transmission media include, but are not limited to, wired media such as coaxial cable(s) and copper wire, and wireless media such as fiber optic signals, acoustic signals, RF signals and infrared signals.

The computing device system 1100 also includes one or more communication connections 1150 coupled to the bus 1105. The communication connection(s) 1150 provide a two-way data communication coupling from the computing device system 1100 to other computing devices on a local area network (LAN) 1165 and/or wide area network (WAN), including the World Wide Web, or Internet 1170. Examples of the communication connection(s) 1150 include, but are not limited to, an integrated services digital network (ISDN) card, modem, LAN card, and any device capable of sending and receiving electrical, electromagnetic, optical, acoustic, RF or infrared signals.

Communications received by the computing device system 1100 can include program instructions and program data. The program instructions received by the computing device system 1100 may be executed by the processing unit 1110 as they are received, and/or stored in the storage device 1120 or other non-volatile storage for later execution.

Conclusion

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for content sensing a user's communication, the method comprising:

generating based on speech recognition a first lattice for a first component of the user's communication, the first lattice representing at least one hypothesis for the first component of the user's communication, the first lattice comprising a first certainty value for a first content word of at least one hypothesis for the first component of the user's communication;

generating a first uncertainty value for the first content word;

generating based on speech recognition a second lattice for a second component of the user's communication, wherein the second component is a different segment of the user's communication than the first component, the second lattice representing at least one hypothesis for the second component of the user's communication, the second lattice comprising a second certainty value for the first content word, wherein the first content word is also a content word of at least one hypothesis for the second component of the user's communication;

generating a second uncertainty value for the first content word based on the first uncertainty value for the first content word and the second certainty value for the first content word;

comparing the second uncertainty value for the first content word to an established confidence threshold; and using the first content word to provide user information if the second uncertainty value of the first content word has a defined relationship to the established confidence threshold.

2. The method for content sensing a user's communication of claim 1, wherein the first content word is used to provide the user information if the defined relationship is that the second uncertainty value of the first content word is less than the established confidence threshold.

3. The method for content sensing a user's communication of claim 1, wherein the first content word is used to provide the user information if the defined relationship is that the second uncertainty value of the first content word is less than or equal to the established confidence threshold.

4. The method for content sensing a user's communication of claim 1, further comprising:

generating the first lattice of one or more nodes for the first component of the user's communication wherein the one or more nodes each represent at least one word of at least one hypothesis for the first component of the user's communication and at least one of the one or more nodes of the first lattice represents the first content word; and generating a second lattice of one or more nodes for the second component of the user's communication wherein the one or more nodes each represent at least one word of at least one hypothesis for the second component of the user's communication and at least one of the one or more nodes of the second lattice represents the first content word.

5. The method for content sensing a user's communication of claim 4, further comprising:
identifying non-content words represented by nodes in the first lattice;
generating an uncertainty value for each content word that is represented by a node in the first lattice wherein a content word is a word represented by a node in the first lattice that is not a non-content word; and
storing the uncertainty value generated for each content word that is represented by a node in the first lattice in a table.

6. The method for content sensing a user's communication of claim 1, wherein the information provided to the user is one or more web link(s) that are a result of a search on the internet using at least the first content word.

7. The method for content sensing a user's communication of claim 1, wherein the information provided the user is at least one document that is generated using at least the first content word.

8. The method for content sensing a user's communication of claim 1, wherein the first uncertainty value generated for the first content word is a result of subtracting the first certainty value generated for the first content word from one.

9. The method for content sensing a user's communication of claim 8, wherein the second uncertainty value generated for the first content word is a result of multiplying the first uncertainty value generated for the first content word by one minus the second certainty value generated for the first content word.

10. The method for content sensing a user's communication of claim 9, further comprising:
storing the first uncertainty value generated for the first content word in a table; and
replacing the first uncertainty value stored for the first content word in the table with the second uncertainty value generated for the first content word.

11. A method for uncertainty interval application in a system, the method comprising:
generating based on speech recognition a first lattice for a first component used by the system, the first lattice representing one or more hypotheses for the first component of the user's communication;
generating based on the first lattice, by a processing unit, an uncertainty value for a portion of a first hypothesis of the one or more hypotheses;
storing the uncertainty value generated for the portion of the first hypothesis wherein the stored uncertainty value is a current accumulated uncertainty value;
generating based on speech recognition at least one additional lattice for each of one or more additional components used by the system, wherein the one or more additional components are distinct from the first component, each of the at least one additional lattices representing at least one hypothesis for one of the one or more additional components used by the system;
generating based on the at least one additional lattice an uncertainty value for a portion of each hypothesis generated for the one or more additional components used by the system;
multiplying the uncertainty value for one or more portions of the hypotheses generated for the one or more additional components used by the system by the current accumulated uncertainty value wherein after each multiplication of an uncertainty value by the current accumulated uncertainty value the result of the multiplication is stored as the current accumulated uncertainty value; and
comparing the current accumulated uncertainty value to a confidence threshold.

12. The method for the uncertainty interval application in a system of claim 11, further comprising:
generating a certainty value for the portion of the first hypothesis;
generating the uncertainty value for the portion of the first hypothesis by subtracting the certainty value for the portion of the first hypothesis from one;
generating a certainty value for a portion of each hypothesis generated for the one or more additional components used by the system; and
generating an uncertainty value for a portion of each hypothesis generated for the one or more additional components of the system by subtracting the certainty value for the portion of the hypothesis from one.

13. The method for uncertainty interval application in a system of claim 11, wherein the first component used by the system is a component of a monitored communication and wherein each of the one or more additional components used by the system are each a component of the monitored communication.

14. The method for uncertainty interval application in a system of claim 11, wherein the portion of the first hypothesis is the first hypothesis, the portion of each hypothesis generated for the one or more additional components of the system is the hypothesis generated for the one or more additional components of the system, and a current accumulated uncertainty value is the result of the multiplication of uncertainty values for the first hypothesis and at least one hypothesis generated for the one or more additional components of the system.

15. The method for uncertainty interval application in a system of claim 11, wherein the portion of the first hypothesis is a node of the first lattice for the first hypothesis, the portion of each hypothesis generated for the one or more additional components of the system is each a node of the at least one additional lattice for the at least one hypothesis generated for the one or more additional components of the system, and a current accumulated uncertainty value is the result of the multiplication of uncertainty values for at least two nodes which represent the same concept.

16. The method for the uncertainty interval application in a system of claim 15, wherein the same concept is the same word.

17. A method for increasing the reliability of word recognition in a user's communication, the method comprising:
generating by a processing unit an initial uncertainty value for a first word that is hypothesized as being included in a first component of the user's communication, the initial uncertainty value generated from a first lattice, the first lattice generated based on speech recognition;
generating a second uncertainty value for the first word when the first word is hypothesized as being included in a second component of the user's communication, wherein the second uncertainty value is based at least in part on the initial uncertainty value for the first word and a second lattice, the second lattice generated based on speech recognition;
saving the second uncertainty value for the first word as the first word's present uncertainty value;
generating a new uncertainty value for the first word when the first word is hypothesized as being included in a new component of the user's communication, wherein a new component of the user's communication is any component of the user's communication other than the first component or the second component of the user's communication, and wherein the new uncertainty value for the first word is based at least in part on the present uncertainty value of the first word;

saving the new uncertainty value for the first word as the first word's present uncertainty value; and designating the first word reliable if a present uncertainty value of the first word has a defined relationship to an established confidence threshold.

18. The method for increasing the reliability of word recognition in a user's communication of claim 17, wherein the first word is designated reliable if the defined relationship is that the present uncertainty value of the first word is less than the established confidence threshold.

19. The method for increasing the reliability of word recognition in a user's communication of claim 17, wherein the first word is designated reliable if the defined relationship is that the present uncertainty value of the first word is less than or equal to the established confidence threshold.

20. The method for increasing the reliability of word recognition in a user's communication of claim 17, further comprising:
- using a first certainty value assigned the first word to generate the initial uncertainty value for the first word, wherein the initial uncertainty value for the first word is the result of subtracting the first certainty value assigned the first word from one;
- using a second certainty value assigned the first word to generate the second uncertainty value for the first word, wherein the second uncertainty value for the first word is the result of multiplying the initial uncertainty value for the first word by one minus the second certainty value assigned the first word; and
- using a new certainty value assigned the first word when the first word is hypothesized as being included in a new component of the user's communication to generate the new uncertainty value for the first word, wherein the new uncertainty value for the first word is the result of multiplying a present uncertainty value of the first word by one minus the new certainty value assigned the first word.

* * * * *